United States Patent
Makino et al.

(10) Patent No.: US 12,377,888 B2
(45) Date of Patent: Aug. 5, 2025

(54) RAILWAY AXLE

(71) Applicant: NIPPON STEEL CORPORATION, Tokyo (JP)

(72) Inventors: Taizo Makino, Tokyo (JP); Chihiro Kozuka, Tokyo (JP); Yuichiro Yamamoto, Tokyo (JP); Toshiyuki Hata, Tokyo (JP); Akihito Yamane, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 410 days.

(21) Appl. No.: 18/007,428

(22) PCT Filed: Sep. 28, 2021

(86) PCT No.: PCT/JP2021/035498
§ 371 (c)(1),
(2) Date: Jan. 30, 2023

(87) PCT Pub. No.: WO2022/071262
PCT Pub. Date: Apr. 7, 2022

(65) Prior Publication Data
US 2023/0271635 A1 Aug. 31, 2023

(30) Foreign Application Priority Data
Sep. 29, 2020 (JP) .................. 2020-164135

(51) Int. Cl.
*C22C 38/44* (2006.01)
*B60B 35/04* (2006.01)
(Continued)

(52) U.S. Cl.
CPC .............. *B61F 15/20* (2013.01); *B60B 35/04* (2013.01); *B60B 35/08* (2013.01); *B60B 37/06* (2013.01);
(Continued)

(58) Field of Classification Search
CPC ...................................................... C22C 38/44
See application file for complete search history.

(56) References Cited

U.S. PATENT DOCUMENTS
2017/0081741 A1   3/2017 Tabata et al.

FOREIGN PATENT DOCUMENTS
CN   101250665 A   8/2008
CN   106460115 A   2/2017
(Continued)

OTHER PUBLICATIONS

Ikuta Fumiaki et al., "Distortion and Residual Stress in Induction Hardened Ring Specimens", Journal of the Japan Society for Heat Treatment, The Japan Society for Heat Treatment, Feb. 2015, vol. 55, No. 1, p. 37-43.

*Primary Examiner* — Jophy S. Koshy
(74) *Attorney, Agent, or Firm* — Greer Burns & Crain Ltd.

(57) ABSTRACT

The railway axle according to this disclosure has a pair of fitting portions and which each include a fitting portion hardened layer and a base metal portion, and a center parallel portion which includes a center parallel portion hardened layer and the base metal portion. The base metal portion has the chemical composition described in the description. In a region having the Vickers hardness of 480 HV or more in the center parallel portion hardened layer, a dislocation density ρ obtained based on a CoKα characteristic X-ray diffraction result is $2.5 \times 10^{16}$ m$^{-2}$ or less, a half-value width B of the (211) diffraction plane is 1.34 degrees or less, and the dislocation density ρ and the half-value width B of the (211) plane obtained by X-ray diffraction satisfy Formula (1).

$$(-4.8 \times 10^{16} \times B + 8.5 \times 10^{16})/\rho \geq 1.00 \quad (1)$$

2 Claims, 3 Drawing Sheets

(51) Int. Cl.

| | |
|---|---|
| *B60B 35/08* | (2006.01) |
| *B60B 37/06* | (2006.01) |
| *B61F 15/20* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/20* | (2006.01) |
| *C22C 38/22* | (2006.01) |
| *C22C 38/24* | (2006.01) |
| B60B 17/00 | (2006.01) |
| C21D 1/10 | (2006.01) |
| C21D 1/22 | (2006.01) |
| C21D 1/25 | (2006.01) |
| C21D 1/60 | (2006.01) |
| C21D 7/13 | (2006.01) |
| C21D 8/00 | (2006.01) |
| C21D 9/00 | (2006.01) |
| C21D 9/28 | (2006.01) |
| C22C 38/26 | (2006.01) |
| C22C 38/28 | (2006.01) |
| C22C 38/32 | (2006.01) |
| C22C 38/42 | (2006.01) |
| C22C 38/46 | (2006.01) |

(52) U.S. Cl.
CPC ............ *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); B60B 17/00 (2013.01); B60Y 2200/30 (2013.01); C21D 1/10 (2013.01); C21D 1/22 (2013.01); C21D 1/25 (2013.01); C21D 1/60 (2013.01); C21D 7/13 (2013.01); C21D 8/005 (2013.01); C21D 9/0075 (2013.01); C21D 9/28 (2013.01); C22C 38/26 (2013.01); C22C 38/28 (2013.01); C22C 38/32 (2013.01); C22C 38/42 (2013.01); C22C 38/44 (2013.01); C22C 38/46 (2013.01)

(56) References Cited

FOREIGN PATENT DOCUMENTS

| | | |
|---|---|---|
| EP | 3778967 A1 | 2/2021 |
| JP | 108202 A | 1/1998 |
| JP | 11279696 A | 10/1999 |
| JP | 2000073140 A | 3/2000 |
| JP | 2007321190 A | 12/2007 |
| WO | 2019194274 A1 | 10/2019 |

RAILWAY AXLE

TECHNICAL FIELD

The present invention relates to an axle, and more particularly relates to a railway axle used for a railway vehicle.

BACKGROUND ART

A railway axle has a pair of fitting portions for a railway wheel to be press-fitted thereon, and a center parallel portion located between the pair of fitting portions. During use, the railway axle supports the weight of a railway vehicle. Specifically, interference is provided to each fitting portion of the railway axle so that a hole diameter of a hub part of the railway wheel is slightly smaller than the diameter of the fitting portions of the railway axle. The railway axle further receives a force in the horizontal direction due to contact between the railway wheel and a rail each time the railway vehicle passes a curved rail section (passes through a curve). In other words, when the railway vehicle passes through a curve, the railway axle repeatedly receives rotating bending stress each time the railway wheel turns once. The amplitude of such bending stress increases when the railway vehicle passes through a curve.

As described above, the railway axle includes the fitting portions, on each of which the railway wheel is press-fitted, and each fitting portion has a contact interfacial pressure against the hole of the hub part of the railway wheel. Therefore, each fitting portion for the railway wheel, slight slippage may repeatedly occur due to contact between the fitting portion and the railway wheel. Hereinafter, slight slippage which occurs due to contact between a fitting portion for the railway axle and the railway wheel will be referred to as "fretting". It is known that a fitting portion of a railway axle may be damaged due to fretting (hereinafter also referred to as "fretting fatigue").

To suppress such fretting fatigue, the aforementioned fitting portion of the railway axle may be inductively hardened. In the outer layer of the fitting portion, hardness increases in an inductively hardened region. In the outer layer of the fitting portion, a region where hardness is increased by performing induction hardening as described above will be referred to as a "hardened layer". Compressive residual stress is generated in the hardened layer. The compressive residual stress generated due to the formation of the hardened layer suppresses the extension of cracks caused by fretting. In other words, the hardened layer of the railway axle formed by performing induction hardening can suppress fretting fatigue in the railway axle.

Each of Japanese Patent Application Publication No. 10-8202 (Patent Literature 1), Japanese Patent Application Publication No. 11-279696 (Patent Literature 2), and Japanese Patent Application Publication No. 2000-73140 (Patent Literature 3) proposes a railway axle where fretting fatigue in a fitting portion is suppressed by performing induction hardening.

The railway axle disclosed in Patent Literature 1 contains, in mass %, C: 0.3 to 0.48%, Si: 0.05 to 1%, Mn: 0.5 to 2%, Cr: 0.5 to 1.5%, Mo: 0.15 to 0.3%, and Ni: 0 to 2.4%. The fitting portions of the railway axle have a hardened layer with the Vickers hardness of 400 or more, and have a region of martensite or bainite located inward thereof. In this railway axle, the depth of the hardened layer is 1 to 4.5 mm. It is described in Patent Literature 1 that the aforementioned railway axle has a high fatigue limit.

The railway axle disclosed in Patent Literature 2 contains, in mass %, C: 0.3 to 0.48%, Si: 0.05 to 1%, Mn: 0.5 to 2%, Cr: 0.5 to 1.5%, Mo: 0.15 to 0.3%, and Ni: 0 to 2.4%. The fitting portions of the railway axle have a hardened layer with the Vickers hardness of 400 or more, and have a region of tempered martensite or bainite located inward thereof. In this railway axle, the depth of the hardened layer is 5.0 mm or more, and is 10% or less of the diameter of the fitting portion. It is described in Patent Literature 2 that the aforementioned railway axle has a high fretting fatigue limit.

The railway axle disclosed in Patent Literature 3 contains, in mass %, C: 0.3 to 0.48%, Si: 0.05 to 1%, Mn: 0.5 to 2%, Cr: 0 to 1.5%, Mo: 0 to 0.3%, and Ni: 0 to 2.4%. The fitting end portions as well as regions around the fitting end portions of this railway axle have a hardened layer with the Vickers hardness of 400 or more. A ratio (K/D) of a thickness (K) of the hardened layer to the fitting portion diameter (D) is 0.005 to 0.05. An upper portion of the hardened layer contains B in an amount in a range of 0.02 to 2%. It is described in Patent Literature 3 that the aforementioned railway axle has an excellent fatigue limit.

CITATION LIST

Patent Literature

Patent Literature 1: Japanese Patent Application Publication No. 10-8202
Patent Literature 2: Japanese Patent Application Publication No. 11-279696
Patent Literature 3: Japanese Patent Application Publication No. 2000-73140
Patent Literature 4: Japanese Patent Application Publication No. 2007-321190

Non Patent Literature

Non Patent Literature 1: IKUTA Fumiaki et al., "Distortion and Residual Stress in Induction Hardened Ring Specimens", Journal of the Japan Society for Heat Treatment, The Japan Society for Heat Treatment, February 2015, vol. 55, No. 1, p. 37-43

SUMMARY OF INVENTION

Technical Problem

Patent Literatures 1 to 3 disclose techniques in which a railway axle is inductively hardened to suppress fretting fatigue in the fitting portions. As described above, when induction hardening is performed on the fitting portions of a railway axle to form a hardened layer, fretting fatigue in the fitting portion can be suppressed.

In this connection, to increase the fatigue strength of a railway axle, it is preferable if fatigue fracture at a center parallel portion can also be reduced in addition to fretting fatigue. On the other hand, in the aforementioned Patent Literatures 1 to 3, the fatigue strength at a center parallel portion of the railway axle is not investigated.

An object of the present disclosure is to provide a railway axle having fitting portions in which fretting fatigue is suppressed, and a center parallel portion that exhibits excellent fatigue strength.

Solution to Problem

A railway axle according to the present disclosure includes:

a pair of fitting portions, on each of which a railway wheel is to be press-fitted, and a center parallel portion located between the pair of fitting portions, wherein:

the fitting portion includes:

a fitting portion hardened layer formed in an outer layer of the fitting portion, and a base metal portion located inward of the fitting portion hardened layer;

the center parallel portion includes:

a center parallel portion hardened layer formed in an outer layer of the center parallel portion, and the base metal portion located inward of the center parallel portion hardened layer;

the base metal portion consists of, in mass %,

C: 0.22 to 0.29%,
Si: 0.15 to 0.40%,
Mn: 0.50 to 0.80%,
P: 0.020% or less,
S: 0.040% or less,
Cr: 0.90 to 1.20%,
Mo: 0.15 to 0.30%,
N: 0.0200% or less,
O: 0.0040% or less,
Ca: 0 to 0.0010%,
Cu: 0 to 0.30%,
Ni: 0 to 0.30%,
Al: 0 to 0.100%,
V: 0 to 0.060%,
Ti: 0 to 0.020%,
Nb: 0 to 0.030%, and
B: 0 to 0.0050%, with the balance being Fe and impurities; and in a region having the Vickers hardness of 480 HV or more in the center parallel portion hardened layer, a dislocation density $\rho$ obtained based on a CoK$\alpha$ characteristic X-ray diffraction result is $2.5 \times 10^{16}$ m$^{-2}$ or less, a half-value width B of a (211) diffraction plane measured by CoK$\alpha$ characteristic X-ray diffraction is 1.34 degrees or less, and the dislocation density $\rho$ obtained based on a CoK$\alpha$ characteristic X-ray diffraction result, and the half-value width B of a (211) diffraction plane measured by CoK$\alpha$ characteristic X-ray diffraction satisfy Formula (1):

$$(-4.8 \times 10^{16} \times B + 8.5 \times 10^{16})/\rho \geq 1.00 \quad (1)$$

where, in Formula (1), a dislocation density in m$^{-2}$ obtained based on a CoK$\alpha$ characteristic X-ray diffraction result is substituted for $\rho$, and a half-value width in degrees of a (211) diffraction plane measured by CoK$\alpha$ characteristic X-ray diffraction is substituted for B.

Advantageous Effects of Invention

The railway axle according to the present disclosure has fitting portions in which fretting fatigue is suppressed, and a center parallel portion that exhibits excellent fatigue strength.

DESCRIPTION OF EMBODIMENTS

Figure 1:
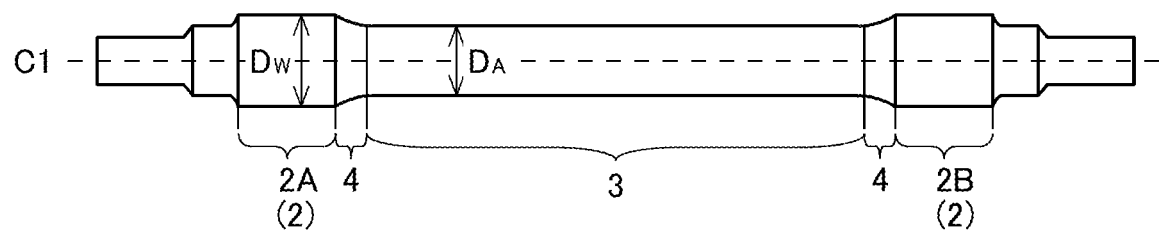
FIG. 1 is a side view of a railway axle according to the present embodiment.

The present inventors investigated and examined approaches for improving fatigue strength at a center parallel portion with respect to a railway axle in which the occurrence of fretting fatigue in fitting portions is suppressed by subjecting the railway axle to induction hardening to form a hardened layer in an outer layer of each fitting portion (hereinafter, also referred to as a "fitting portion hardened layer"). As a result, the present inventors obtained the following findings.

(A) Regarding Chemical Composition

When a center parallel portion of a railway axle is inductively hardened, a hardened layer is formed in an outer layer of the center parallel portion (hereinafter, also referred to as a "center parallel portion hardened layer"). It is considered that if a center parallel portion hardened layer is formed, the hardness of the outer layer of the center parallel portion increases, and the fatigue strength at the center parallel portion increases. Therefore, first, on the premise that a center parallel portion hardened layer will be formed, the present inventors conducted detailed studies regarding a chemical composition that can sufficiently increase the fatigue strength of the center parallel portion.

As a result, the present inventors considered that, in a railway axle, if the chemical composition of a base metal portion which is located inward of a center parallel portion hardened layer consists of, in mass %, C: 0.22 to 0.29%, Si: 0.15 to 0.40%, Mn: 0.50 to 0.80%, P: 0.020% or less, S: 0.040% or less, Cr: 0.90 to 1.20%, Mo: 0.15 to 0.30%, N: 0.0200% or less, O: 0.0040% or less, Ca: 0 to 0.0010%, Cu: 0 to 0.30%, Ni: 0 to 0.30%, Al: 0 to 0.100%, V: 0 to 0.060%, Ti: 0 to 0.020%, Nb: 0 to 0.030%, and B: 0 to 0.0050%, with the balance being Fe and impurities, there is a possibility of increasing the fatigue strength of a center parallel portion at which a center parallel portion hardened layer is formed by induction hardening.

Next, the present inventors produced various kinds of railway axles having a fitting portion hardened layer and a center parallel portion hardened layer by subjecting steel materials having the aforementioned chemical composition that were made into the shape of a railway axle to induction hardening and tempering. As a result, the present inventors have found that even in the case of railway axles which have a base metal portion having the aforementioned chemical composition and which have the same level of hardness at the surface of a center parallel portion, in some cases the fatigue strength of the center parallel portion of the respective railway axles differs among the railway axles. In other words, it has been clarified by the studies of the present inventors that the fatigue strength in the center parallel portion cannot be sufficiently increased only by simply increasing the hardness of the center parallel portion hardened layer.

(B) Regarding Dislocation Density

With regard to the reason why, in the inductively hardened railway axles, center parallel portions having a base metal portion that had the aforementioned chemical composition had different fatigue strengths to each other even when the respective hardnesses of the surfaces thereof were approximately the same, the present inventors considered that the heat history due to induction hardening and tempering may influence the fatigue strength in some way. Therefore the present inventors investigated and examined methods for increasing the fatigue strength of the center parallel portion by focusing on the dislocation density. Specifically, the present inventors defined a region having the Vickers hardness of 480 HV or more in a center parallel portion hardened layer as a "specific hardness region", and conducted investigations and studies regarding the dislocation density in the specific hardness region.

Here, in a specific hardness region formed by performing induction hardening, because the Vickers hardness is an extremely high hardness of 480 HV or more, the dislocation density is liable to be high. On the other hand, in the microstructure of a repeatedly stressed steel material, there is a possibility that dislocations will become the starting point of a crack due to dislocations moving and accumulating. In other words, in a specific hardness region where the dislocation density is high, there is a tendency for dislocations to easily accumulate and consequently for the fatigue strength to easily decrease. Therefore, if the dislocation density is reduced in a specific hardness region where the dislocation density is high, the accumulation of dislocations that becomes the starting point of a crack is less likely to occur, and hence there is a possibility that the fatigue strength will increase.

As a result of detailed studies conducted by the present inventors based on the above findings, it has been clarified that in a center parallel portion which has a base metal portion having the aforementioned chemical composition, and a center parallel portion hardened layer, if a dislocation density $\rho$ obtained based on a CoK$\alpha$ characteristic X-ray diffraction result in a specific hardness region is decreased to $2.5 \times 10^{16}$ m$^{-2}$ or less, on the condition that the other requirements of the present embodiment are satisfied, there is a possibility of increasing the fatigue strength of the center parallel portion. Therefore, in a center parallel portion of the railway axle according to the present embodiment, a base metal portion has the aforementioned chemical composition, and a dislocation density $\rho$ obtained based on a CoK$\alpha$ characteristic X-ray diffraction result in a specific hardness region is made $2.5 \times 10^{16}$ m$^{-2}$ or less.

(C) Regarding Lattice Strain

On the other hand, even when the center parallel portion had a base metal portion having the aforementioned chemical composition, and a center parallel portion hardened layer, and the dislocation density $\rho$ obtained based on a CoK$\alpha$ characteristic X-ray diffraction result in a specific hardness region of the center parallel portion hardened layer was $2.5 \times 10^{16}$ m$^{-2}$ or less, there were cases where the fatigue strength was not sufficiently increased. Therefore the present inventors next investigated and examined methods for increasing the fatigue strength of the center parallel portion by focusing on lattice strain. Here, among a plurality of diffraction planes obtained by X-ray diffraction (XRD), if the (211) diffraction plane is used, changes in the c-axis of the crystal lattice that result from dissolution and precipitation of carbon (C) caused by induction hardening and tempering can be observed. Therefore, taking lattice strain in a specific hardness region as an index, the present inventors focused their attention on the half-value width of the (211) diffraction plane, and investigated and examined the relation with fatigue strength in the center parallel portion.

As described above, in the microstructure of a repeatedly stressed steel material, there is a possibility that dislocations will become the starting point of a crack due to dislocations moving and accumulating. On the other hand, a specific hardness region is formed by performing induction hardening. Here, because induction hardening involves transformation of the microstructure of the steel material, it is considered that microscopic strain occurs in crystal lattices in the microstructure of an inductively hardened steel material. There is a possibility that dislocations that moved due to stress tend to stagnate in a region where the amount of microscopic strain that occurred in crystal lattices is locally large. Consequently, there is a possibility that in a region where lattice strain is large, the starting point of a crack may arise due to the accumulation of dislocations.

As a result of detailed studies conducted by the present inventors based on the above findings, it has been clarified that in a center parallel portion which has a base metal portion having the aforementioned chemical composition and has a center parallel portion hardened layer, if a half-value width B of the (211) diffraction plane measured by CoK$\alpha$ characteristic X-ray diffraction in a specific hardness region is decreased to 1.34 degrees or less, on the condition that the other requirements of the present embodiment are satisfied, there is a possibility of increasing the fatigue strength of the center parallel portion. Therefore, in a center parallel portion of the railway axle according to the present embodiment, a base metal portion has the aforementioned chemical composition, a dislocation density $\rho$ obtained based on a CoK$\alpha$ characteristic X-ray diffraction result is made $2.5 \times 10^{16}$ m$^{-2}$ or less in a specific hardness region, and furthermore a half-value width B of the (211) diffraction plane measured by CoK$\alpha$ characteristic X-ray diffraction is made 1.34 degrees or less.

As a result of further detailed studies by the present inventors, it has been clarified that if a dislocation density $\rho$ obtained based on a CoK$\alpha$ characteristic X-ray diffraction result, and a half-value width B of the (211) diffraction plane measured by CoK$\alpha$ characteristic X-ray diffraction satisfy the following Formula (1), the fatigue strength of the center parallel portion is stably increased:

$$(-4.8 \times 10^{16} \times B + 8.5 \times 10^6)/\rho \geq 1.00 \tag{1}$$

where, in Formula (1), a dislocation density in m$^{-2}$ obtained based on a CoK$\alpha$ characteristic X-ray diffraction result is substituted for $\rho$, and a half-value width in degrees of the (211) diffraction plane measured by CoK$\alpha$ characteristic X-ray diffraction is substituted for B.

Let Fn1 be defined as Fn1=$(-4.8 \times 10^{16} \times B + 8.5 \times 10^{16})/\rho$. Fn1 is an index that indicates the degree of accumulation of dislocations in a specific hardness region. When Fn1 is less than 1.00, in a specific hardness region to which repeated stress has been applied, dislocations accumulate and become the starting point of a crack. As a result, fatigue strength cannot be sufficiently obtained in the central parallel portion. On the other hand, if Fn1 is 1.00 or more, accumulation of dislocations is suppressed even in a specific hardness region to which repeated stress has been applied, and the fatigue strength in the central parallel portion can be increased.

The present inventors consider that the reason for this is as follows. As described above, in a center parallel portion which has a base metal portion having the aforementioned chemical composition and which has a center parallel portion hardened layer, there is a possibility of a crack occurring due to dislocations moving due to repeated stress. In other words, rather than just simply decreasing the dislocation density, if the occurrence of a situation in which dislocations become dense and a crack or slipping occurs can be suppressed, there is a possibility that the fatigue strength of the center parallel portion will be increased. Therefore, in the railway axle according to the present embodiment, in a specific hardness region where the dislocation density is liable to become high, a dislocation density ρ obtained based on a CoKα characteristic X-ray diffraction result is made $2.5 \times 10^{16}$ m$^{-2}$ or less, a half-value width B of the (211) diffraction plane measured by CoKα characteristic X-ray diffraction is made 1.34 degrees or less, and furthermore, Fn1 is made 1.00 or more. The present inventors consider that, as a result, a balance can be achieved between dislocation density and lattice strain, and the fatigue strength of the center parallel portion can be increased.

Accordingly, in the railway axle according to the present embodiment, in a center parallel portion which has a base metal portion having the aforementioned chemical composition, and has a center parallel portion hardened layer, a dislocation density ρ obtained based on a CoKα characteristic X-ray diffraction result in a specific hardness region is $2.5 \times 10^6$ m$^{-2}$ or less, a half-value width B of the (211) diffraction plane measured by CoKα characteristic X-ray diffraction is 1.34 degrees or less, and in addition, the dislocation density ρ obtained based on a CoKα characteristic X-ray diffraction result, and the half-value width B of the (211) diffraction plane measured by CoKα characteristic X-ray diffraction satisfy Formula (1). As a result, the railway axle according to the present embodiment has excellent fatigue strength at a center parallel portion.

The gist of the railway axle of the present embodiment that has been completed based on the above findings is as follows.

[1]
A railway axle, including:
a pair of fitting portions, on each of which a railway wheel is to be press-fitted, and
a center parallel portion located between the pair of fitting portions, wherein:
the fitting portion includes:
a fitting portion hardened layer formed in an outer layer of the fitting portion, and
a base metal portion located inward of the fitting portion hardened layer;
the center parallel portion includes:
a center parallel portion hardened layer formed in an outer layer of the center parallel portion, and
the base metal portion located inward of the center parallel portion hardened layer;
the base metal portion consists of, in mass %,
C: 0.22 to 0.29%,
Si: 0.15 to 0.40%,
Mn: 0.50 to 0.80%,
P: 0.020% or less,
S: 0.040% or less,
Cr: 0.90 to 1.20%,
Mo: 0.15 to 0.30%,
N: 0.0200% or less,
O: 0.0040% or less,
Ca: 0 to 0.0010%,
Cu: 0 to 0.30%,
Ni: 0 to 0.30%,
Al: 0 to 0.100%,
V: 0 to 0.060%,
Ti: 0 to 0.020%,
Nb: 0 to 0.030%, and
B: 0 to 0.0050%,
with the balance being Fe and impurities; and
in a region having the Vickers hardness of 480 HV or more in the center parallel portion hardened layer,
a dislocation density ρ obtained based on a CoKα characteristic X-ray diffraction result is $2.5 \times 10^{16}$ m$^{-2}$ or less,
a half-value width B of a (211) diffraction plane measured by CoKα characteristic X-ray diffraction is 1.34 degrees or less, and
the dislocation density ρ obtained based on a CoKα characteristic X-ray diffraction result, and the half-value width B of a (211) diffraction plane measured by CoKα characteristic X-ray diffraction satisfy Formula (1):

$$(-4.8 \times 10^{16} \times B + 8.5 \times 10^{16})/\rho \geq 1.00 \quad (1)$$

where, in Formula (1), a dislocation density in m$^{-2}$ obtained based on a CoKα characteristic X-ray diffraction result is substituted for ρ, and a half-value width in degrees of a (211) diffraction plane measured by CoKα characteristic X-ray diffraction is substituted for B.

[2]
The railway axle according to [1], wherein:
the base metal portion contains, in mass %, one or more elements selected from the group consisting of:
Cu: 0.01 to 0.30%,
Ni: 0.01 to 0.30%,
Al: 0.005 to 0.100%,
V: 0.005 to 0.060%,
Ti: 0.002 to 0.020%,
Nb: 0.002 to 0.030%, and
B: 0.0003 to 0.0050%.

Hereunder, a railway axle according to the present embodiment is described in detail.

[Configuration of Railway Axle]

FIG. 1 is a side view illustrating the railway axle according to the present embodiment. Referring to FIG. 1, a railway axle 1 of the present embodiment includes a pair of fitting portions 2A and 2B, and a center parallel portion 3. Each of the pair of fitting portions 2A and 2B is a circular column having a diameter $D_W$. The center axes of the fitting portions 2A and 2B are aligned with a center axis C1 of the railway axle 1. The center axis C1 of the railway axle 1 extends in the longitudinal direction of the railway axle 1. In the description hereafter, the phrase "the direction of the center axis C1" of the railway axle 1 has the same meaning as "the longitudinal direction" of the railway axle 1.

In FIG. 1, the fitting portion 2A is connected with the left end of the center parallel portion 3. In FIG. 1, the fitting portion 2B is connected with the right end of the center parallel portion 3. In the description hereafter, the fitting portions 2A and 2B are also collectively referred to as "fitting portion 2". A railway wheel not shown in the drawing is to be press-fitted on the fitting portion 2.

The center parallel portion 3 is located between the pair of fitting portions 2A and 2B. In FIG. 1, the left end of the center parallel portion 3 is connected with the fitting portion 2A which is located at the left portion of the railway axle 1. The right end of the center parallel portion 3 is connected with the fitting portion 2B which is located at the right portion of the railway axle 1. The center parallel portion 3 is a circular column having a diameter $D_A$. The diameter $D_A$ of the center parallel portion 3 is smaller than the diameter $D_W$ of the fitting portion 2. The center axis of the center parallel portion 3 is aligned with the center axis C1 of the railway axle 1. In other words, the center parallel portion 3 is located coaxially with the pair of fitting portions 2.

The pair of fitting portions 2 may be solid or hollow. Similarly, the center parallel portion 3 may be solid or hollow. Although not particularly limited, the diameter $D_A$ of the center parallel portion is, for example, 100 to 200 mm. Although not particularly limited, the diameter $D_w$ of the fitting portion 2 is, for example, 110 to 260 mm.

Referring to FIG. 1, the railway axle 1 also includes tapered portions 4 each of which continuously connects the center parallel portion 3 and the corresponding fitting portion 2 with each other, each tapered portion 4 being located between an end portion of the center parallel portion 3 and an inner end of the corresponding fitting portion 2. The diameter of the tapered portion 4 increases from the end portion of the center parallel portion 3 toward the inner end of the fitting portion 2 in the direction of the center axis C1 of the railway axle 1. In a cross section including the center axis C1 of the railway axle 1 as illustrated in FIG. 1, the surface of the tapered portion 4 may be curved or may be linear. Note that the railway axle 1 need not include the tapered portions 4. In such a case, each end portion of the center parallel portion 3 is connected with the inner end of the corresponding fitting portion 2, so that a step height is formed between each end portion of the center parallel portion 3 and the inner end of the corresponding fitting portion 2.

Figure 2:
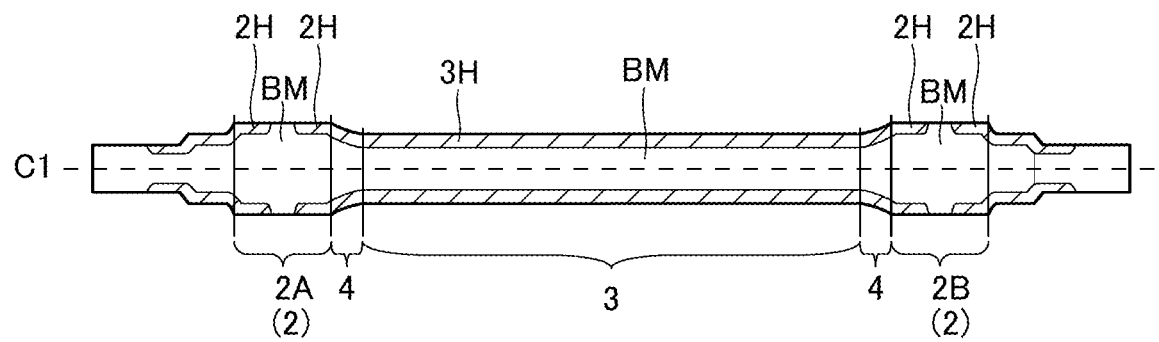
FIG. 2 is a cross-sectional view of a plane including a center axis C1 of a railway axle 1 of the present embodiment illustrated in FIG. 1.

FIG. 2 is a cross-sectional view along a plane including the center axis C1 of the railway axle 1 of the present embodiment illustrated in FIG. 1. Referring to FIG. 2, each fitting portion 2 (2A and 2B) includes a fitting portion hardened layer 2H formed in an outer layer, and a base metal portion BM located inward of the fitting portion hardened layer 2H. The fitting portion hardened layer 2H is formed in the outer layer in a range from the surface of the fitting portion 2 to a predetermined depth.

Referring to FIG. 2, the fitting portion hardened layer 2H need not be formed over the entire surface of the fitting portion 2. In FIG. 2, in the direction of the center axis C1 of the railway axle 1, the fitting portion hardened layer 2H is formed at a portion in a region that is further to the outer side than the center position of the fitting portion 2, and at a portion in a region that is further to the inner side than the center position of the fitting portion 2, and the fitting portion hardened layer 2H is not formed in the region of a portion that includes the center position of the fitting portion 2. Thus, the fitting portion hardened layer 2H need not be formed over the entire surface of the fitting portion 2, and may be formed at least in a region of one portion of the surface of the fitting portion 2 in the direction of the center axis C1. Further, the fitting portion hardened layer 2H may be formed over the entire surface of the fitting portion 2. The fitting portion hardened layer 2H will be described later.

Referring to FIG. 2, the center parallel portion 3 includes a center parallel portion hardened layer 3H formed in the outer layer of the center parallel portion 3, and the base metal portion BM that is located inward of the center parallel portion hardened layer 3H. The center parallel portion hardened layer 3H is formed in the outer layer in a range from the surface of the center parallel portion 3 to a predetermined depth. The center parallel portion hardened layer 3H is formed over the entire surface of the center parallel portion 3. The center parallel portion hardened layer 3H will be described later.

[Regarding Chemical Composition of Base Metal Portion BM of Center Parallel Portion 3]

In the present embodiment, the chemical composition of the base metal portion BM of the pair of fitting portions 2, and the chemical composition of the base metal portion BM of the center parallel portion 3 contain the following elements. Here, in a cross section perpendicular to the center axis C1 of the railway axle 1, a line segment connecting the surface of the railway axle 1 and the center axis C1 is defined as radius R. With such a definition, the phrase "chemical composition of the base metal portion BM" means the chemical composition at an R/2 position of the fitting portion 2, and at an R/2 position of the center parallel portion 3. Hereinafter, "%" in relation to an element means mass percent unless otherwise specified.

C: 0.22 to 0.29%

Carbon (C) increases the hardness of steel. C also increases the hardness of a hardened layer formed by induction hardening. If the C content is less than 0.22%, even when the contents of the other elements are within the ranges given in the present embodiment, the hardness of the base metal portion BM, the fitting portion hardened layer 2H, and the center parallel portion hardened layer 3H will decrease. Consequently, in some cases the fatigue strength of the center parallel portion 3 may decrease. On the other hand, if the C content is more than 0.29%, even when the contents of the other elements are within the ranges given in the present embodiment, quench cracking may occur when performing induction hardening. Accordingly, the C content is set to 0.22 to 0.29%. A lower limit of the C content is preferably 0.23%, and more preferably is 0.24%. An upper limit of the C content is preferably 0.28%, and more preferably is 0.27%.

Si: 0.15 to 0.40%

Silicon (Si) deoxidizes the steel. Si also increases the temper softening resistance of the steel, and increases the fatigue strength in the center parallel portion 3. If the Si content is less than 0.15%, these effects cannot be sufficiently obtained even when the contents of the other elements are within the ranges given in the present embodiment. On the other hand, if the Si content is more than 0.40%, even when the contents of the other elements are within the ranges given in the present embodiment, quench cracking may occur when performing induction hardening. Accordingly, the Si content is set to 0.15 to 0.40%. A lower limit of the Si content is preferably 0.20%, more preferably 0.23%, and further preferably 0.25%. An upper limit of the Si content is preferably 0.37%, more preferably 0.35%, and further preferably 0.33%.

Mn: 0.50 to 0.80%

Manganese (Mn) increases the hardenability of the steel, and thickens the hardened layers 2H and 3H formed by induction hardening. If the Mn content is less than 0.50%, even when the contents of the other elements are within the ranges given in the present embodiment, the center parallel portion hardened layer 3H may become too thin. In such case, fatigue strength cannot be sufficiently obtained in the center parallel portion 3. On the other hand, if the Mn content is more than 0.80%, even when the contents of the other elements are within the ranges given in the present embodiment, the fitting portion hardened layer 2H and the center parallel portion hardened layer 3H formed by induction hardening may become too thick. In such case, the compressive residual stress of the fitting portion hardened layer 2H will decrease, and fatigue strength cannot be sufficiently obtained in the fitting portion 2. Accordingly, the Mn content is set to 0.50 to 0.80%. A lower limit of the Mn content is preferably 0.55%, more preferably 0.57%, further preferably 0.60%, and further preferably 0.62%. An upper limit of the Mn content is preferably 0.78%, more preferably 0.75%, further preferably 0.73%, and further preferably 0.70%.

P: 0.020% or less

Phosphorus (P) is an impurity which is unavoidably contained. In other words, the P content is more than 0%. P segregates at grain boundaries, thereby decreasing the fatigue strength of the steel. If the P content is more than 0.020%, even when the contents of the other elements are within the ranges given in the present embodiment, the fatigue strength of the railway axle 1 will decrease. Accordingly, the P content is set to 0.020% or less. An upper limit of the P content is preferably 0.018%, more preferably 0.016%, further preferably 0.015%, and further preferably 0.014%. The P content is preferably as low as possible. However, extremely reducing the P content will significantly increase the production cost. Therefore, when industrial production is taken into consideration, a lower limit of the P content is preferably 0.001%, and more preferably 0.002%.

S: 0.040% or Less

Sulfur (S) is an impurity which is unavoidably contained. In other words, the S content is more than 0%. S combines with Mn to form MnS. MnS decreases the fatigue strength of the steel. If the S content is more than 0.040%, even when the contents of the other elements are within the ranges given in the present embodiment, stress will concentrate in MnS and consequently the fatigue strength of the center parallel portion 3 will decrease. Accordingly, the S content is set to 0.040% or less. An upper limit of the S content is preferably 0.030%, more preferably 0.020%, further preferably 0.015%, and further preferably 0.010%. The S content is preferably as low as possible. However, extremely reducing the S content will significantly increase the production cost. Therefore, when industrial production is taken into consideration, a lower limit of the S content is preferably 0.001%, and more preferably 0.002%.

Cr: 0.90 to 1.20%

Chromium (Cr) increases the hardenability of the steel, and increases the hardness of the fitting portion hardened layer 2H and the center parallel portion hardened layer 3H formed by induction hardening. If the Cr content is less than 0.90%, the center parallel portion hardened layer 3H may become too thin. In such case, the fatigue strength in the center parallel portion 3 will decrease. On the other hand, if the Cr content is more than 1.20%, even when the contents of the other elements are within the ranges given in the present embodiment, the fitting portion hardened layer 2H and the center parallel portion hardened layer 3H formed by induction hardening may become too thick. In this case, the compressive residual stress of the fitting portion hardened layer 2H will decrease, and sufficient fatigue strength cannot be obtained in the fitting portion 2. Accordingly, the Cr content is set to 0.90 to 1.20%. A lower limit of the Cr content is preferably 0.95%, more preferably 1.00%, further preferably 1.02%, and further preferably 1.05%. An upper limit of the Cr content is preferably 1.19%, more preferably 1.17%, and further preferably 1.15%.

Mo: 0.15 to 0.30%

Molybdenum (Mo) increases the strength of the steel. If the Mo content is less than 0.15%, this effect cannot be sufficiently obtained even when the contents of the other elements are within the ranges given in the present embodiment. On the other hand, if the Mo content is more than 0.30%, even when the contents of the other elements are within the ranges given in the present embodiment, the aforementioned effect will be saturated. In addition, if the Mo content is more than 0.30%, the production cost will excessively increase. Accordingly, the Mo content is set to 0.15 to 0.30%. A lower limit of the Mo content is preferably 0.17%, more preferably 0.19%, further preferably 0.20%, and further preferably 0.21%. An upper limit of the Mo content is preferably 0.29%, more preferably 0.28%, and further preferably 0.27%.

N: 0.0200% or Less

Nitrogen (N) is unavoidably contained. In other words, the N content is more than 0%. N combines with Al and the like to form fine nitrides, thereby refining the grains. However, if the N content is too high, coarse nitrides will be formed, and consequently the fatigue strength of the steel will decrease. If the N content is more than 0.0200%, the fatigue strength of the railway axle 1 will decrease even when the contents of the other elements are within the ranges given in the present embodiment. Accordingly, the N content is 0.0200% or less. An upper limit of the N content is preferably 0.0150%, more preferably 0.0120%, further preferably 0.0100%, further preferably 0.0090%, further preferably 0.0080%, and further preferably 0.0070%. A lower limit of the N content for more effectively obtaining the aforementioned effect is preferably 0.0010%, more preferably 0.0020%, and further preferably 0.0030%.

O: 0.0040% or Less

Oxygen (O) is an impurity that is unavoidably contained. In other words, the O content is more than 0%. In some cases, O forms coarse oxides which become a starting point of fatigue fracture. If the O content is more than 0.0040%, the fatigue strength in the center parallel portion 3 will decrease even when the contents of the other elements are within the ranges given in the present embodiment. Accordingly, the O content is set to 0.0040% or less. An upper limit of the O content is preferably 0.0030%, more preferably 0.0025%, further preferably 0.0020%, and further preferably 0.0015%. The O content is preferably as low as possible. However, extremely reducing the O content will significantly increase the production cost. Therefore, when industrial production is taken into consideration, a lower limit of the O content is preferably 0.0001%, more preferably 0.0002%, and further preferably 0.0005%.

Ca: 0 to 0.0010%

Calcium (Ca) is an impurity. Ca need not be contained. In other words, the Ca content may be 0%. Ca causes silicate inclusions (group C specified in JIS G 0555 (2003)) to agglomerate, thus decreasing the fatigue strength of the steel. If the Ca content is more than 0.0010%, silicate inclusions will become a starting point of fatigue fracture and the fatigue strength in the center parallel portion 3 will decrease even when the contents of the other elements are within the ranges given in the present embodiment. Accordingly, the Ca content is set to 0 to 0.0010%. An upper limit of the Ca content is preferably 0.0006%, more preferably 0.0004%, and further preferably 0.0003%.

The balance of the chemical composition of the base metal portion BM of the fitting portion 2 and the center parallel portion 3 of the railway axle 1 according to the present embodiment is Fe and impurities. Here, the term "impurities" means elements which are mixed in from ore or scrap as a raw material or from the production environment or the like when the steel material for the railway axle 1 is industrially produced, and which are permitted within a range that does not adversely affect the railway axle 1 of the present embodiment.

The chemical composition of the base metal portion BM of the fitting portion 2 and the center parallel portion 3 of the railway axle 1 according to the present embodiment may further contain one or more elements selected from the group consisting of Cu and Ni in lieu of a part of Fe. Each of these elements is an optional element, and each element increases the strength of the steel.

Cu: 0 to 0.30%

Copper (Cu) is an optional element and need not be contained. In other words, the Cu content may be 0%. When Cu is contained, the Cu increases the strength of the steel. If even a small amount of Cu is contained, this effect can be obtained to some extent. However, if the Cu content is more than 0.30%, the hot workability of the steel will decrease even when the contents of the other elements are within the ranges given in the present embodiment. Accordingly, the Cu content is set to 0 to 0.30%. A lower limit of the Cu content is preferably more than 0%, more preferably 0.01%, and further preferably 0.02%. An upper limit of the Cu content is preferably 0.25%, more preferably 0.20%, further preferably 0.15%, further preferably 0.10%, and further preferably 0.05%.

Ni: 0 to 0.30%

Nickel (Ni) is an optional element and need not be contained. In other words, the Ni content may be 0%. When Ni is contained, the Ni increases the strength of the steel. If even a small amount of Ni is contained, this effect can be obtained to some extent. However, if the Ni content is more than 0.30%, the aforementioned effect will be saturated even when the contents of the other elements are within the ranges given in the present embodiment. Accordingly, the Ni content is set to 0 to 0.30%. A lower limit of the Ni content is preferably more than 0%, more preferably 0.01%, further preferably 0.02%, and further preferably 0.04%. An upper limit of the Ni content is preferably 0.25%, more preferably is less than 0.20%, further preferably is 0.15%, and further preferably is 0.10%.

The chemical composition of the base metal portion BM of the fitting portion 2 and the center parallel portion 3 of the railway axle 1 according to the present embodiment may further contain Al in lieu of a part of Fe.

Al: 0 to 0.100%

Aluminum (Al) is an optional element and need not be contained. In other words, the Al content may be 0%. When Al is contained, the Al deoxidizes the steel. Al also combines with N to form AlN, and refines the grains. As a result, the toughness of the steel increases. If even a small amount of Al is contained, these effects can be obtained to some extent. However, if the Al content is more than 0.100%, even when the contents of the other elements are within the ranges given in the present embodiment, coarse oxide inclusions will form and consequently the fatigue strength of the railway axle 1 will decrease. Accordingly, the Al content is 0 to 0.100%. A lower limit of the Al content is preferably more than 0%, more preferably 0.005%, further preferably 0.007%, further preferably 0.010%, further preferably 0.015%, and further preferably 0.020%. An upper limit of the Al content is preferably 0.080%, more preferably 0.060%, further preferably 0.050%, further preferably 0.045%, and further preferably 0.040%. In the present description, the term "Al content" means the content of acid-soluble Al (sol. Al).

The chemical composition of the base metal portion BM of the fitting portion 2 and the center parallel portion 3 of the railway axle 1 according to the present embodiment may further contain one or more elements selected from the group consisting of V, Ti, and Nb in lieu of a part of Fe. Each of these elements is an optional element, and each element increases the strength of the steel.

V: 0 to 0.060%

Vanadium (V) is an optional element, and need not be contained. In other words, the V content may be 0%. When V is contained, V combines with N or C to form V(C, N). In this case, grains are refined and the strength of the steel increases. If even a small amount of V is contained, this effect can be obtained to some extent. However, if the V content is more than 0.060%, the toughness of the steel will decrease even when the contents of the other elements are within the ranges given in the present embodiment. Accordingly, the V content is set to 0 to 0.060%. A lower limit of the V content is preferably more than 0%, more preferably 0.005%, further preferably 0.008%, and further preferably 0.010%. An upper limit of the V content is preferably 0.055%, more preferably 0.050%, further preferably 0.045%, and further preferably 0.040%.

Ti: 0 to 0.020%

Titanium (Ti) is an optional element and need not be contained. In other words, the Ti content may be 0%. When Ti is contained, Ti combines with N to form fine TiN. TiN increases the strength of the steel. TiN also refines grains, thus increasing the fatigue strength of the steel. If even a small amount of Ti is contained, this effect can be obtained to some extent. However, if the Ti content is more than 0.020%, even when the contents of the other elements are within the ranges given in the present embodiment, TiN precipitates become paths of cracks, thus decreasing the toughness of the steel. Accordingly, the Ti content is set to 0 to 0.020%. A lower limit of the Ti content is preferably more than 0%, more preferably is 0.002%, and further preferably is 0.003%. An upper limit of the Ti content is preferably 0.018%, more preferably 0.015%, further preferably 0.013%, further preferably 0.010%, and further preferably 0.007%.

Nb: 0 to 0.030%

Niobium (Nb) is an optional element and need not be contained. In other words, the Nb content may be 0%. When Nb is contained, Nb combines with N or C to form Nb(C, N). In this case, the Nb(C, N) refines grains and increases the strength and toughness of the steel. If even a small amount of Nb is contained, this effect can be obtained to some extent. However, if the Nb content is more than 0.030%, even when the contents of the other elements are within the ranges given in the present embodiment, carbides and/or carbo-nitrides formed in steel may coarsen. In such case, the toughness of the steel will, on the contrary, decrease. Accordingly, the Nb content is set to 0 to 0.030%. A lower limit of the Nb content is preferably more than 0%, more preferably 0.002%, further preferably 0.003%, and further preferably 0.005%. An upper limit of the Nb content is preferably 0.029%, more preferably 0.027%, further preferably 0.025%, and further preferably 0.020%.

The chemical composition of the base metal portion BM of the fitting portion 2 and the center parallel portion 3 of the railway axle 1 according to the present embodiment may further contain B in lieu of a part of Fe.

B: 0 to 0.0050%

Boron (B) is an optional element and need not be contained. In other words, the B content may be 0%. When B is contained, the B increases the hardenability of the steel. If even a small amount of B is contained, this effect can be obtained to some extent. On the other hand, if the B content is more than 0.0050%, even when the contents of the other elements are within the ranges given in the present embodiment, the toughness of the steel will decrease. Accordingly, the B content is set to 0 to 0.0050%. A lower limit of the B content is preferably more than 0%, more preferably 0.0003%, further preferably 0.0005%, and further preferably 0.0007%. An upper limit of the B content is preferably 0.0040%, more preferably 0.0030%, and further preferably 0.0020%.

[Regarding Microstructure of Base Metal Portion BM]

Preferably, in the railway axle 1 according to the present embodiment, the microstructure of the base metal portion BM is principally composed of martensite and bainite. In the present description, the phrase "principally composed of martensite and bainite" means that, in the microstructure, the total area fraction of martensite and bainite is 80% or more. Here, the term "martensite" also includes tempered martensite. The term "bainite" includes tempered bainite.

The balance other than martensite and bainite in the microstructure of the base metal portion BM of the railway axle 1 according to the present embodiment is, for example, ferrite. The microstructure of the base metal portion BM of the railway axle 1 corresponds to the microstructure of a near-surface portion of the railway axle before induction hardening. If the microstructure of the base metal portion BM of the railway axle 1 is principally composed of martensite and bainite, the hardness of the near-surface portion of the railway axle 1 will increase. Furthermore, if the microstructure is principally composed of martensite and bainite, the microstructure of the near-surface portion will be rapidly austenitized during high-frequency heating. In this case, the martensite fraction of a hardened layer formed by induction hardening will increase, and the hardness of the hardened layer will increase. As a result, the fatigue strength of the railway axle 1 after induction hardening will further increase.

The total area fraction of martensite and bainite in the microstructure of the base metal portion BM of the railway axle 1 can be determined by the following method. Five samples for observing the microstructure are taken from an R/2 position in a cross section perpendicular to the direction of the center axis C1 of the fitting portion 2 or the center parallel portion 3. The cross section perpendicular to the center axis C1 is used as an observation surface. The observation surface of each sample is polished to a mirror-finished surface, and thereafter is immersed in Nital etching reagent for approximately 10 seconds to reveal the microstructure by etching. The etched observation surface is observed using an optical microscope. One visual field is set to 40000 $\mu m^{-2}$ (magnification of ×500), and one visual field is observed per sample (that is, a total of five visual fields are observed using five samples).

In each visual field, martensite and bainite, and phases other than martensite and bainite (ferrite and the like) are identified based on contrast. It is difficult to distinguish between martensite and bainite based on contrast. However, martensite and bainite are easily distinguishable from phases other than martensite and bainite, such as ferrite, based on contrast. The total area fraction of martensite and bainite in each visual field is determined based on the total area of the identified martensite and bainite, and the area of each visual field (40000 $\mu m^2$). The arithmetic average value of the total area fractions of martensite and bainite determined in each visual field is defined as the total area fraction (%) of martensite and bainite.

[Regarding Fitting Portion Hardened Layer 2H and Center Parallel Portion Hardened Layer 3H]

In the railway axle 1 according to the present embodiment, the fitting portion hardened layer 2H is formed in each of the pair of fitting portions 2. Further, in the railway axle 1 according to the present embodiment, the center parallel portion hardened layer 3H is formed in the center parallel portion 3. In the present description, the term "hardened layer" means a region formed by induction hardening in which the Vickers hardness increased in comparison to the base metal portion BM. Specifically, in the present description, each of the fitting portion hardened layer 2H and the center parallel portion hardened layer 3H is defined as a region in which the critical hardness is 350 HV in the Vickers hardness, that is defined as an effective case depth in JIS G 0559 (2008). In short, in the present description, the critical hardness of the fitting portion hardened layer 2H and the center parallel portion hardened layer 3H is 350 HV in the Vickers hardness.

[Regarding Microstructure of Fitting Portion Hardened Layer 2H and Center Parallel Portion Hardened Layer 3H]

Preferably, in the railway axle 1 according to the present embodiment, the microstructure of the fitting portion hardened layer 2H and the center parallel portion hardened layer 3H is principally composed of martensite and bainite. In the present description, the phrase "principally composed of martensite and bainite" means that, in the microstructure, the total area fraction of martensite and bainite is 80% or more. Here, the term "martensite" also includes tempered martensite. The term "bainite" includes tempered bainite.

The total area fraction of martensite and bainite in the microstructure of the fitting portion hardened layer 2H and the center parallel portion hardened layer 3H of the railway axle 1 can be determined in the same manner as the total area fraction of martensite and bainite in the microstructure of the base metal portion BM of the railway axle 1 according to the present embodiment. Specifically, five samples for observing the microstructure are taken from the fitting portion hardened layer 2H and/or the center parallel portion hardened layer 3H identified by the method described above. A cross section perpendicular to the center axis C1 is used as an observation surface. The observation surface of each sample is polished to a mirror-finished surface, and thereafter is immersed in Nital etching reagent for approximately 10 seconds to reveal the microstructure by etching. The etched observation surface is observed using an optical microscope. One visual field is set to 40000 $\mu m^2$ (magnification of ×500), and one visual field is observed per sample (that is, a total of five visual fields are observed using five samples).

[Regarding Specific Hardness Region]

In the present embodiment, a region having the Vickers hardness of 480 HV or more in the center parallel portion hardened layer 3H is defined as a "specific hardness region". As described above, the critical hardness of the center parallel portion hardened layer 3H is 350 HV in the Vickers hardness. In other words, the term "specific hardness region" means a region where the hardness is particularly high in the center parallel portion hardened layer 3H.

In the present embodiment, a specific hardness region can be identified by the following method. The center parallel portion hardened layer 3H according to the present embodiment is subjected to the Vickers hardness test in accordance with JIS Z 2244 (2009) with a load of 2.9 N and a pitch of 0.1 mm to measure the Vickers hardness (HV). For example, the Vickers hardness (HV) may be measured in the radial direction (depth direction) of the railway axle 1 from the surface of the center parallel portion 3, with respect to a face obtained by cutting the railway axle 1 perpendicularly to the center axis C1. Based on a hardness transition curve obtained in this way, a region having the Vickers hardness of 480 HV or more from the surface of the railway axle 1 is identified. The identified region having the Vickers hardness of 480 HV or more is defined as a specific hardness region.

[Regarding Dislocation Density]

In the railway axle 1 according to the present embodiment, a dislocation density ρ obtained based on a CoKα characteristic X-ray diffraction result in a region having the Vickers hardness of 480 HV or more in the center parallel portion hardened layer 3H is $2.5 \times 10^{16}$ m$^{-2}$ or less. As described above, a region having the Vickers hardness of 480 HV or more in the center parallel portion hardened layer 3H according to the present embodiment is referred to as a specific hardness region. In the present embodiment, in a specific hardness region of the center parallel portion hardened layer 3H, a dislocation density ρ obtained based on a CoKα characteristic X-ray diffraction result is $2.5 \times 10^{16}$ m$^{-2}$ or less.

As described above, a specific hardness region is a region where the hardness is particularly high in the center parallel portion hardened layer 3H. Therefore, the dislocation density is liable to be high in a specific hardness region. On the other hand, there is a possibility of dislocations receiving repeated stress and moving in the steel material, and becoming a starting point of a crack. In other words, it is considered that the higher the dislocation density ρ obtained based on a CoKα characteristic X-ray diffraction result is, the more easily a starting point of a crack will occur and the more likely that the fatigue strength will decrease. Accordingly, in the railway axle 1 according to the present embodiment, in the center parallel portion hardened layer 3H, in a specific hardness region the dislocation density ρ that is obtained based on a CoKα characteristic X-ray diffraction result is made $2.5 \times 10^{16}$ m$^{-2}$ or less. As a result, on the condition that the other requirements pertaining to the railway axle 1 according to the present embodiment are satisfied, the center parallel portion 3 has excellent fatigue strength.

In the present embodiment, an upper limit of the dislocation density ρ obtained based on a CoKα characteristic X-ray diffraction result in a specific hardness region of the center parallel portion hardened layer 3H is preferably $2.4 \times 10^{16}$ m$^{-2}$. Note that, a lower limit of the dislocation density ρ obtained based on a CoKα characteristic X-ray diffraction result in a specific hardness region of the center parallel portion hardened layer 3H is not particularly limited. However, if the dislocation density is too low, in some cases the Vickers hardness of 480 HV or more that is defined as a specific hardness region cannot be obtained. Accordingly, in the present embodiment, a lower limit of the dislocation density ρ obtained based on a CoKα characteristic X-ray diffraction result in a specific hardness region of the center parallel portion hardened layer 3H is, for example, $1.4 \times 10^{16}$ m$^{-2}$.

In the railway axle 1 according to the present embodiment, the dislocation density ρ obtained based on a CoKα characteristic X-ray diffraction result can be determined by the following method. A specific hardness region is identified by the method described above from the center parallel portion 3 of the railway axle 1 according to the present embodiment. A test specimen for measuring the dislocation density is prepared from the specific hardness region. Although not particularly limited, the size of the test specimen is, for example, with respect to the railway axle 1, 10 mm in the circumferential direction×20 mm in the axial direction×5 mm in the radial direction. The thickness direction of the test specimen is the radial direction (depth direction) of the railway axle 1. In this case, the observation surface of the test specimen is a face having a size of 10 mm in the circumferential direction×20 mm in the axial direction with respect to the railway axle 1.

The observation surface of the test specimen is subjected to mechanical polishing and, in addition, electrolytic grinding is performed to remove strain of the outer layer. The observation surface after electrolytic grinding is subjected to X-ray diffractometry (XRD) to obtain a diffraction profile. The XRD is performed by employing CoKα rays as the radiation source, 30 kV as the tube voltage, and 100 mA as the tube current. Further, the diffraction angle (2θ) is set within the range of 45 to 105 degrees, and measurement is performed at a pitch of 0.02 degrees, at a rate of 0.6 seconds per point. Note that, calibration of a peak location corresponding to the diffraction angle can be performed by confirming that the diffraction peak location of a specific plane does not deviate from a reference position using a Si standard sheet. Further, with respect to the half-value width, correction is performed by measuring the broadening of the device in advance using $LaB_6$ (lanthanum hexaboride) as a standard sample.

From the obtained diffraction profile, a peak location (2θ) and a half-value width (B') are respectively determined for the (110), (211), and (220) diffraction planes. The heterogeneous strain ε is determined based on the determined peak location (2θ) of each diffraction plane, the determined half-value width (B') of each diffraction plane, and the Williamson-Hall equation (Formula (2)):

$$B' \times \cos\theta/\lambda = 0.9/D + 2\varepsilon \times \sin\theta/\lambda \quad (2)$$

where, in Formula (2), θ represents the diffraction angle, λ represents the wavelength of the X-ray (0.1788965 nm), and D represents the crystallite diameter.

More specifically, B'×cos (θ)/λ and sin (θ)/λ are determined based on the determined peak location (2θ) of each diffraction plane, and half-value width (B') of each diffraction plane. For each of the (110), (211), and (220) diffraction planes, the obtained B'×cos (θ)/λ is plotted on the ordinate and the obtained sin (θ)/λ is plotted on the abscissa to obtain a straight line by curve fitting. The heterogeneous strain ε is obtained based on the slope (2ε) of the obtained straight line. The dislocation density ρ (m$^{-2}$) obtained based on a CoKα characteristic X-ray diffraction result can be determined based on the obtained ε, Burgers vector b, and the following Formula (3):

$$\rho = 14.4 \times \varepsilon^2/b^2 \quad (3)$$

where, in Formula (3), b represents the Burgers vector (0.25 nm) of a body-centered cubic structure (iron).

[Regarding Half-Value Width of (211) Diffraction Plane]

In the railway axle 1 according to the present embodiment, in a region where the Vickers hardness is 480 HV or more in the center parallel portion hardened layer 3H, a half-value width B of the (211) diffraction plane measured by CoKα characteristic X-ray diffraction is 1.34 degrees or less. As described above, the half-value width B of the (211) diffraction plane measured by CoKα characteristic X-ray diffraction is an index of microscopic strain of crystal lattices.

As described above, a specific hardness region is a region where the hardness is particularly high and the dislocation density is liable to become high in the center parallel portion hardened layer 3H. Therefore, as described above, in the present embodiment, the dislocation density ρ obtained based on a CoKα characteristic X-ray diffraction result in a specific hardness region is decreased to $2.5 \times 10^{16}$ m$^{-2}$ or less. However, even when the dislocation density ρ obtained based on a CoKα characteristic X-ray diffraction result in a specific hardness region is decreased to $2.5 \times 10^{16}$ m$^{-2}$ or less, in a region where microscopic strain of crystal lattices is locally large, there is a tendency for dislocations to easily stagnate due to repeated stress. Therefore, in the railway axle 1 according to the present embodiment, the microscopic strain of crystal lattices is decreased in a specific hardness region of the center parallel portion hardened layer 3H.

Accordingly, in the center parallel portion 3 of the railway axle 1 according to the present embodiment, the base metal portion has the aforementioned chemical composition, and in a specific hardness region of the center parallel portion hardened layer 3H, a dislocation density ρ obtained based on a CoKα characteristic X-ray diffraction result is $2.5 \times 10^{16}$ m$^{-2}$ or less, and a half-value width B of the (211) diffraction plane measured by CoKα characteristic X-ray diffraction is 1.34 degrees or less. In the present embodiment, in a specific hardness region of the center parallel portion hardened layer 3H, an upper limit of the half-value width B of the (211) diffraction plane measured by CoKα characteristic X-ray diffraction is preferably 1.33 degrees, and more preferably 1.32 degrees. Note that, in a specific hardness region of the center parallel portion hardened layer 3H, a lower limit of the half-value width B of the (211) diffraction plane measured by CoKα characteristic X-ray diffraction is not particularly limited. In the present embodiment, in a specific hardness region of the center parallel portion hardened layer 3H, the lower limit of the half-value width B of the (211) diffraction plane measured by CoKα characteristic X-ray diffraction is, for example, 0.9 degrees.

In the railway axle 1 according to the present embodiment, the half-value width B of the (211) diffraction plane measured by CoKα characteristic X-ray diffraction can be determined by the following method. A test specimen is prepared according to the same conditions as in the case of determining the dislocation density ρ that is obtained based on a CoKα characteristic X-ray diffraction result that is described above, and a diffraction profile is obtained by XRD according to the same conditions as in the case of determining the dislocation density ρ that is obtained based on a CoKα characteristic X-ray diffraction result that is described above. A peak of the (211) diffraction plane is identified from the obtained diffraction profile, and the half-value width of the peak is determined. The determined half-value width is defined as the half-value width B of the (211) diffraction plane measured by CoKα characteristic X-ray diffraction.

[Regarding Formula (1)]

In the railway axle 1 according to the present embodiment, in a region where the Vickers hardness is 480 HV or more in the center parallel portion hardened layer 3H, the dislocation density ρ obtained based on a CoKα characteristic X-ray diffraction result, and the half-value width B of the (211) diffraction plane measured by CoKα characteristic X-ray diffraction satisfy Formula (1):

$$(-4.8 \times 10^{16} \times B + 8.5 \times 10^{16})/\rho \geq 1.00 \quad (1)$$

where, in Formula (1), a dislocation density in m$^{-2}$ obtained based on a CoKα characteristic X-ray diffraction result is substituted for ρ, and a half-value width in degrees of the (211) diffraction plane measured by CoKα characteristic X-ray diffraction is substituted for B.

Fn1 ($=(-4.8 \times 10^{16} \times B + 8.5 \times 10^{16})/\sigma$) is an index that indicates the degree of accumulation of dislocations in a specific hardness region. When Fn1 is less than 1.00, in a specific hardness region to which repeated stress has been applied, dislocations accumulate and become the starting point of a crack. As a result, fatigue strength cannot be sufficiently obtained in the central parallel portion. On the other hand, if Fn1 is 1.00 or more, accumulation of dislocations is suppressed even in a specific hardness region to which repeated stress has been applied, and the fatigue strength in the central parallel portion can be increased.

Accordingly, in the center parallel portion 3 of the railway axle 1 according to the present embodiment, the base metal portion has the aforementioned chemical composition, and in a specific hardness region of the center parallel portion hardened layer 3H, the dislocation density ρ obtained based on a CoKα characteristic X-ray diffraction result is $2.5 \times 10^{16}$ m$^{-2}$ or less, the half-value width B of the (211) diffraction plane measured by CoKα characteristic X-ray diffraction is 1.34 degrees or less, and furthermore Fn1 is 1.00 or more. In the present embodiment, the lower limit of Fn1 is preferably 1.01, and more preferably is 1.03. In the present embodiment, the upper limit of Fn1 is not particularly limited. In the present embodiment, the upper limit of Fn1 is, for example, 3.0.

[Production Method]

One example of a method for producing the railway axle according to the present embodiment will now be described.

Molten steel having the above-mentioned chemical composition is produced. An ingot is produced using the molten steel. Hot forging is performed on the ingot to produce a crude product having the shape of an axle. It suffices that the heating temperature at which the ingot is heated during hot forging falls within a well-known temperature range. The heating temperature may be set to 1000 to 1300° C., for example. The produced crude product is subjected to quenching and tempering, or a normalizing treatment.

In the case of performing quenching and tempering, it suffices that the upper limits adopted for the quenching and tempering are well-known conditions. Specifically, in the quenching, the quenching temperature is set to the $A_{c3}$ transformation point or more. The crude product is held at the quenching temperature, and thereafter is rapidly cooled by water cooling or oil cooling. In the tempering, the tempering temperature is set to the $A_{c1}$ transformation point or less. The crude product is held at the tempering temperature, and thereafter is allowed to cool. In the case of performing a normalizing treatment, the crude product is held at a heat treatment temperature that is higher than the $A_{c1}$ transformation point, and thereafter is allowed to cool. Note that, tempering may be performed following the normalizing treatment.

The crude product that underwent the quenching and tempering, or the normalizing treatment is, as necessary, subjected to machining. Thereafter, the crude product is subjected to an induction hardening treatment and tempering. The induction hardening treatment and the tempering are described in detail hereunder.

[Regarding Induction Hardening Treatment]

In the induction hardening treatment, an outer layer portion of the crude product is heated to a temperature higher than the $A_{c3}$ transformation point by high-frequency heating, and thereafter is rapidly cooled. In this case, the outer layer portion of the crude product transforms from austenite to martensite or bainite. As a result, a hardened layer is formed in the outer layer portion of the crude product.

The induction hardening treatment can be performed using a well-known high-frequency heating apparatus and a well-known cooling apparatus. For example, an annular high-frequency heating apparatus may be used as the high-frequency heating apparatus, and an annular cooling apparatus may be used as the cooling apparatus. In this case, by the center axis C1 of the railway axle 1 and the annular high-frequency heating apparatus and the annular cooling apparatus being arranged coaxially, an induction hardening treatment can be efficiently performed on the surface of each fitting portion 2 and the center parallel portion 3 of the railway axle 1.

In the induction hardening treatment according to the present embodiment, the high-frequency heating is not particularly limited provided that the outer layer portion of the crude product can be heated to the $A_{c3}$ transformation point or more. In other words, in the present embodiment, it suffices to perform well-known high-frequency heating as the high-frequency heating. For example, the frequency of the alternating current of the high-frequency heating apparatus may be set to 1 to 10 kHz.

In the induction hardening treatment according to the present embodiment, the cooling rate is appropriately controlled when performing cooling. Here, if the cooling rate during quenching is too slow, the microstructure of the fitting portion hardened layer 2H and the center parallel portion hardened layer 3H does not become a microstructure that is principally composed of martensite and bainite, and in some cases the hardness of the fitting portion hardened layer 2H and the center parallel portion hardened layer 3H cannot be sufficiently increased in the railway axle 1 that is produced. For this reason, in the conventional induction hardening, rapid cooling is performed as the cooling when conducting induction hardening. On the other hand, because heating to a temperature higher than the $A_{c3}$ transformation point is performed by high-frequency heating, transformation accompanies rapid cooling. Consequently, the faster that the cooling rate is, the higher that the dislocation density after induction hardening becomes.

In the induction hardening treatment according to the present embodiment, in addition, only the outer layer portion of the crude product is heated and cooled. As a result, in the railway axle 1 that is produced, the fitting portion hardened layer 2H, the center parallel portion hardened layer 3H, and the base metal portion BM are formed. In other words, in the induction hardening treatment according to the present embodiment, only one part of the crude product is heated, and thereafter is rapidly cooled. Therefore, in the induction hardening according to the present embodiment, the cooling rate is liable to be fast in comparison to quenching in which the entire steel material is heated using a heat treatment furnace or the like and is thereafter subjected to rapid cooling.

The cooling rate in the case of cooling after heating only an outer layer portion by an induction hardening treatment will now be described by giving a specific example. Patent Literature 4 (Japanese Patent Application Publication No. 2007-321190) discloses a method for producing a steel material that is excellent in fatigue characteristics. In paragraph [0051] of Patent Literature 4 it is described that it is preferable to set the cooling rate during induction hardening to 200° C./sec or more. More specifically, referring to paragraph [0054] and Tables 2-1 to 2-3 of Patent Literature 4, it is disclosed that, in the case of making the hardened layer depth fall within the range of about 2 to 7 mm, the cooling rate after holding at the heating temperature in induction hardening is 1000° C./sec.

In addition, Non Patent Literature 1 discloses a cooling rate within the range of 500 to 200° C. in an induction hardening treatment. Specifically, FIG. 13 to FIG. 15 on page 5 in Non Patent Literature 1 show the relation between the time (s) from the start of heating, and the temperature (° C.) of works (materials to be heated) in an induction hardening treatment. Referring to FIGS. 13 to 15 of Non Patent Literature 1, when works are being cooled, the time taken until reaching 200° C. from 500° C. is 2 seconds or less in each case. In other words, in FIGS. 13 to 15 of Non Patent Literature 1, it is shown that, in an induction hardening treatment, the cooling rate in the range from 500 to 200° C. is 150° C./sec or more at each of a plurality of measurement points.

As described above, in the conventional induction hardening treatment, rapid cooling is performed at an extremely fast cooling rate. On the other hand, in the induction hardening treatment according to the present embodiment, the cooling rate is controlled from 500° C. before reaching the Ms point to 200° C. after passing the Mf point to thereby adjust the cooling rate so that the dislocation density ρ does not become too high. Specifically, in the induction hardening treatment according to the present embodiment, a cooling rate CR in the range from 500 to 200° C. is reduced to 80° C./sec or less. As a result, in the specific hardness region of the center parallel portion hardened layer 3H of the produced railway axle 1, the dislocation density ρ obtained based on a CoKα characteristic X-ray diffraction result can be reduced to $2.5 \times 10^{16}$ m$^{-2}$ or less.

An upper limit of the cooling rate CR in the range from 500 to 200° C. is preferably 60° C./sec, more preferably 50° C./sec, and further preferably 40° C./sec. On the other hand, as described above, if the cooling rate CR in the range from 500 to 200° C. is too slow, in some cases a microstructure primarily composed of martensite and bainite will not be formed. Therefore, in the induction hardening treatment according to the present embodiment, a lower limit of the cooling rate CR in the range from 500 to 200° C. is for example, 10° C./sec.

Note that, the cooling rate CR in the range from 500 to 200° C. can be determined by measuring the surface temperature of the crude product using a K-type thermocouple. Further, a method for adjusting the cooling rate CR in the range from 500 to 200° C. is not particularly limited. For example, in the case of cooling the crude product by shower water cooling or mist water cooling, the cooling rate CR in the range from 500 to 200° C. can be adjusted by adjusting the water amount of the shower or mist.

[Regarding Tempering]

In the present embodiment, tempering is performed on the crude product already subjected to the induction hardening treatment. During the tempering, precipitation of ε-carbide, recovery (elimination) of dislocations, and reduction of lattice strain occurs in the microstructure of the crude product. In other words, by performing tempering, the aforementioned dislocation density ρ that was increased by the induction hardening treatment, and the half-value width B of the (211) plane obtained by X-ray diffraction can both be decreased.

In the tempering according to the present embodiment, λ defined by the following Formula (A) is made to fall within a range of 8600 to 10000:

$$\lambda = T(\log_{10}(t) + 20) \tag{A}$$

where, in Formula (A), the tempering temperature in K is substituted for T, and the tempering time in hours is substituted for t.

In the present description, the term "tempering temperature T(K)" corresponds to the temperature (K) of the heat treatment furnace which performs the tempering. Furthermore, in the present description, the term "tempering time" corresponds to the time (hours) for which the railway axle 1 is held at the tempering temperature T(K).

If λ is too small, in some cases the dislocation density ρ obtained based on a CoKα characteristic X-ray diffraction result, and/or the half-value width B of the (211) diffraction plane measured by CoKα characteristic X-ray diffraction cannot be sufficiently decreased. On the other hand, if λ is too large, in some cases the dislocation density ρ obtained based on a CoKα characteristic X-ray diffraction result will decrease too much, and a hardness of 480 HV or more in the Vickers hardness cannot be obtained in the center parallel portion hardened layer 3H. Accordingly, in the tempering in the present embodiment, λ is made to fall within the range of 8600 to 10000. As a result, in the railway axle 1 according to the present embodiment, in a specific hardness region of the center parallel portion hardened layer 3H, the dislocation density ρ obtained based on a CoKα characteristic X-ray diffraction result can be decreased to $2.5 \times 10^{16}$ m$^{-2}$ or less, and the half-value width B of the (211) diffraction plane measured by CoKα characteristic X-ray diffraction can be made 1.34 degrees or less.

In the railway axle 1 according to the present embodiment, the fatigue strength of the center parallel portion 3 is increased by achieving a balance between the dislocation density (that is, the dislocation density ρ obtained based on a CoKα characteristic X-ray diffraction result) and the lattice strain (that is, the half-value width B of the (211) diffraction plane measured by CoKα characteristic X-ray diffraction) in a specific hardness region of the center parallel portion hardened layer 3H. On the other hand, as described above, the dislocation density ρ obtained based on a CoKα characteristic X-ray diffraction result varies depending on the cooling rate in the range from 500 to 200° C. in the induction hardening treatment. Further, the dislocation density ρ obtained based on a CoKα characteristic X-ray diffraction result and the half-value width B of the (211) diffraction plane measured by CoKα characteristic X-ray diffraction vary depending on λ in the tempering. Therefore, a balance is achieved between the induction hardening treatment and the tempering according to the present embodiment.

Specifically, in the induction hardening treatment and the tempering according to the present embodiment, F defined by the following Formula (B) is made to fall within the range of 90000 to 400000:

$$F = CR \times \lambda \quad \text{(B)}$$

where, in Formula (B), the cooling rate in the range from 500 to 200° C. is substituted in ° C./sec for CR, and λ defined by Formula (A) is substituted for λ.

If F is too small, in some cases the half-value width B of the (211) diffraction plane measured by CoKα characteristic X-ray diffraction may be too high in a specific hardness region of the center parallel portion hardened layer 3H. On the other hand, if F is too large, in some cases Fn1 may be less than 1.00. Accordingly, in the present embodiment, F is made to fall within the range of 90000 to 400000. As a result, in the railway axle 1 according to the present embodiment, in a specific hardness region of the center parallel portion hardened layer 3H, the dislocation density ρ obtained based on a CoKα characteristic X-ray diffraction result can be decreased to $2.5 \times 10^{16}$ m$^{-2}$ or less, and the half-value width B of the (211) diffraction plane measured by CoKα characteristic X-ray diffraction can be made 1.34 degrees or less, and in addition, Fn1 can be made 1.00 or more.

The crude product that underwent tempering is cooled to room temperature. In this case, the cooling after the tempering is not particularly limited. For example, the crude product already subjected to tempering may be allowed to cool to room temperature. The crude product already subjected to tempering may, in addition, be subjected to final machining. In other words, machining is an optional treatment process. Note that, in the case of performing machining, the machining (lathe turning and polishing) is performed within a range in which a hardened layer having a required depth can be ensured. The railway axle 1 according to the present embodiment can be produced by the above-described processes.

The method for producing the railway axle 1 described above is one example of a method for producing the railway axle 1 of the present embodiment. Accordingly, a method for producing the railway axle 1 according to the present embodiment is not limited to the production method described provided that it is possible to produce the railway axle 1 according to the present embodiment in which the respective elements in the chemical composition of the base metal portion BM of the fitting portions 2 and the center parallel portion 3 are within the ranges described above, and in a specific hardness region of the center parallel portion hardened layer 3H the dislocation density ρ obtained based on a CoKα characteristic X-ray diffraction result is $2.5 \times 10^{16}$ m$^{-2}$ or less, the half-value width B of the (211) diffraction plane measured by CoKα characteristic X-ray diffraction is 1.34 degrees or less, and Fn1 is 1.00 or more.

Hereunder, the advantageous effects of the railway axle 1 of the present embodiment will be described more specifically by way of examples. The conditions adopted in the following examples are one example of conditions adopted for confirming the feasibility and advantageous effects of the railway axle 1 of the present embodiment. Accordingly, the railway axle 1 of the present embodiment is not limited to the following one example of conditions.

Example 1

Figure 3:
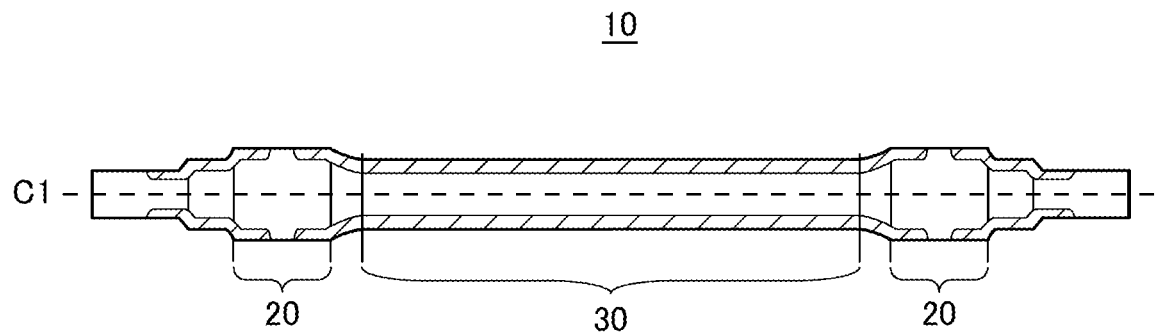
FIG. 3 is a cross-sectional view of a crude product in the present examples.

In Example 1, the railway axle 1 was produced and the fatigue strength in the center parallel portion 3 was evaluated. Specifically, molten steels having a chemical composition consisting of C: 0.26%, Si: 0.29%, Mn: 0.69%. P: 0.012%, S: 0.006%, Cr: 1.11%, Mo: 0.26%, N: 0.0036%, O: 0.0019%, and Al: 0.032%, with the balance being Fe and impurities were produced. An ingot was produced from each of the produced molten steels. After heating each ingot to 1250° C., hot forging was performed to produce a crude product 10 in the shape of an axle that is illustrated in FIG. 3. FIG. 3 is a cross-sectional view of the crude product in the present example. The crude product 10 includes a pair of fitting portions 20, and a center parallel portion 30 located between the pair of fitting portions 20.

The crude product 10 of each test number was subjected to quenching and tempering. The heat treatment temperature during quenching was set to 890° C. which is higher than the $A_{c3}$ transformation point of the steel. The crude product 10 was held at the heat treatment temperature, and thereafter was subjected to water quenching. The crude product 10 of each test number after quenching was subjected to tempering. Regarding the tempering conditions, the tempering temperature was adjusted between 550 to 670° C. so that the crude products 10 of the respective test numbers had substantially the same surface hardness. Each crude product 10 was held at the tempering temperature for 120 minutes, and thereafter was allowed to cool until becoming normal temperature.

Each tempered crude product 10 was subjected to an induction hardening treatment. The induction hardening treatment was performed on a hatched region of the crude product 10 that is shown in FIG. 3. The quenching temperature during induction hardening was set to the $A_{c3}$ transformation point or more of the steel of each test number. Table 1 shows the cooling rate CR (° C./sec) in the range from 500 to 200° C. during induction hardening for the crude product 10 of each test number. Note that, the cooling rate CR (° C./sec) was measured using a K-type thermocouple. Further, adjustment of the cooling rate CR (° C./sec) was performed by adjusting the water amount during cooling.

TABLE 1

| Test Number | CR (° C./sec) | T (° C.) | t (hour) | λ | F | Dislocation Density ρ ($10^{16}$ m$^{-2}$) | Half-value Width B (degrees) | Fn1 | Fatigue Test |
|---|---|---|---|---|---|---|---|---|---|
| 1-1 | 20 | 200 | 1.0 | 9460 | 189200 | 2.1 | 1.25 | 1.19 | E |
| 1-2 | 100 | 200 | 3.0 | 9686 | 968600 | 2.6 | 1.21 | 1.04 | NA |
| 1-3 | 12 | 150 | 0.3 | 8239 | 98868 | 2.0 | 1.35 | 1.01 | NA |
| 1-4 | 50 | 200 | 1.5 | 9543 | 477150 | 2.4 | 1.29 | 0.96 | NA |

The crude product 10 of each test number that had undergone induction hardening was subjected to tempering. The tempering temperature (° C.) and the tempering time when performing the tempering on the crude product 10 of each test number are shown as "T(° C.)" and "t (hrs)", respectively, in Table 1. In addition, λ (=(273+T)×($\log_{10}$(t))+20) was determined based on the tempering temperature T (° C.) and the tempering time t (hrs) when performing the tempering on the crude product 10 of each test number, and the aforementioned Formula (A). The value of λ determined for each test number is shown in Table 1. In addition, F (=CR×λ) was determined based on the cooling rate CR (° C./sec) in the range from 500 to 200° C. during induction hardening performed on the crude product 10 of each test number, λ when performing tempering, and the aforementioned Formula (B). The value of F determined for each test number is shown in Table 1.

Figure 4:
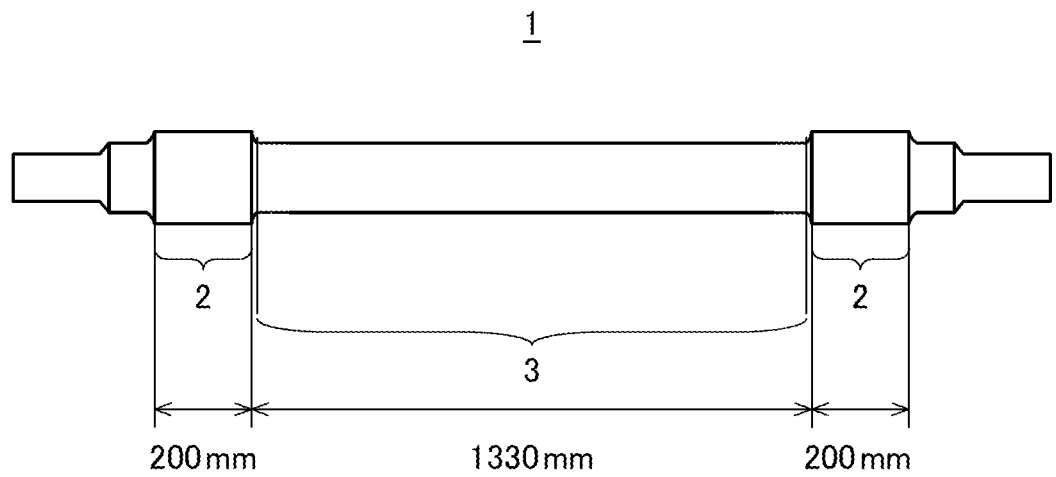
FIG. 4 is a side view of a railway axle in the present examples.

Each crude product 10 that underwent the induction hardening treatment was subjected to machining to produce a railway axle 1 illustrated in FIG. 4. FIG. 4 is a side view of the railway axle of the present example. The railway axle 1 of each test number included a pair of fitting portions 2, and a center parallel portion 3. Each fitting portion 2 had a width of 200 mm and a diameter $D_W$ of 150 mm. The center parallel portion 3 had a diameter $D_A$ of 136 mm. A radius of curvature at a fillet part between the fitting portions 2 and the center parallel portion 3 was 10 mm. Railway axles 1 were produced by the above production process.

[Evaluation Tests]

Each produced railway axle 1 was subjected to an X-ray diffraction measurement test and a fatigue test that are described hereunder.

[X-Ray Diffraction Measurement Test]

A specific hardness region was identified from the center parallel portion hardened layer 3H of the produced railway axle 1 of each test number. A test specimen for an X-ray diffraction measurement test was prepared from the specific hardness region of the center parallel portion hardened layer 3H of each test number. The size of the test specimen was 10 mm in the circumferential direction×20 mm in the axial direction×5 mm in the radial direction of the railway axle 1. An area of 10 mm in the circumferential direction×20 mm in the axial direction was adopted as an observation surface, and the observation surface was subjected to mechanical polishing and electrolytic grinding, and X-ray diffraction measurement was then conducted according to the method described above. An X-ray diffractometer was used for the measurement, and the measurement conditions were as follows: CoKα characteristic X-ray, a tube voltage of 30 kV, and a tube current of 100 mA. Calibration of a peak location corresponding to the diffraction angle was performed by confirming that the diffraction peak location of a specific plane did not deviate from a reference position using a Si standard sheet. Further, with respect to the half-value width, correction was performed by measuring the broadening of the device in advance using $LaB_6$ (lanthanum hexaboride) as a standard sample.

A peak location (2θ) and a half-value width (B') of the (110), (211), and (220) planes were determined from the obtained CoKα characteristic X-ray diffraction profile, and the dislocation density ρ ($10^{16}$ m$^{-2}$) in the test specimen was determined using the aforementioned Formula (2) and Formula (3). The dislocation density ρ ($10^{16}$ m$^{-2}$) obtained based on the CoKα characteristic X-ray diffraction result determined for each test number is shown as "dislocation density ρ" in Table 1.

In addition, the peak of the (211) diffraction plane was identified from the obtained CoKα characteristic X-ray diffraction profile, and the half-value width thereof was determined. The determined half-value width B (degrees) of the (211) diffraction plane measured by CoKα characteristic X-ray diffraction of each test number is shown as "half-value width B (degrees)" in Table 1. Further, for each test number, Fn1 (=(−4.8×$10^{16}$×B+8.5×$10^{16}$)/ρ) was determined based on the dislocation density ρ obtained based on a CoKα characteristic X-ray diffraction result ($10^{16}$ m$^{-2}$), the half-value width B (degrees) of the (211) diffraction plane measured by CoKα characteristic X-ray diffraction, and the aforementioned Formula (1). The value of Fn1 determined for each test number is shown in Table 1.

[Fatigue Test]

Figure 5:
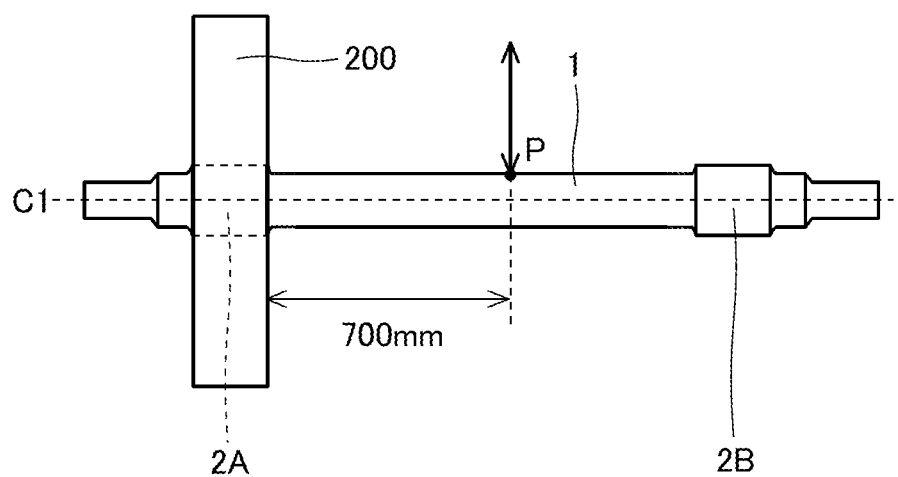
FIG. 5 is a schematic view of a fatigue testing device for testing a railway axle 1 in the present examples.

FIG. 5 is a schematic view illustrating a fatigue testing device used to test the railway axle 1 in the present example. Referring to FIG. 5, a jig 200 corresponding to a wheel was press-fitted on the fitting portion 2A on one side of the railway axle 1 of each test number. The jig 200 corresponding to a wheel was fixed. In this way, the railway axle 1 was placed in a cantilever state. A bending fatigue test was then performed in which a load was repeatedly applied in a direction perpendicular to the direction of the center axis C1 of the railway axle 1 at a position (point P in FIG. 5) 700 mm inward from the inner end of the fixed fitting portion 2A of the railway axle 1. An electro-hydraulic servo fatigue tester (load capacity 500 kN) made by SAGINOMIYA SEI-SAKUSHO, INC. was used as a tester.

As the test conditions, an alternating load with a stress ratio of −1, and a frequency of 1 to 3 Hz were adopted. The upper limit of the number of cycles was set to $5\times10^6$ cycles, and the test was performed until the railway axle 1 broke. If the railway axle 1 was unbroken by the $5\times10^6$ cycle, the test was terminated at that point, and the railway axle 1 was determined as being unbroken. Here, the minimum value of the test stress in a case where the railway axle 1 had broken by the $5\times10^6$ cycle was taken as $F_B$. Further, the maximum value of the test stress in a case where the railway axle 1 had not broken upon reaching the $5\times10^6$ cycle at a test stress less than or equal to $F_B$ was taken as $F_M$. The average value of $F_M$ and $F_B$ was taken as $F_A$ and the value of $F_A$ which satisfies $(F_B-F_M)/F_A \leq 0.10$ was defined as the fatigue limit. The fatigue limit of Test Number 1-1 determined in this manner was adopted as the test stress applied to the railway axle 1 of each test number.

The railway axle 1 of each test number was subjected to a fatigue test in which the test stress determined as described above (that is, the fatigue limit of Test Number 1-1) was applied. The test conditions were the same as the conditions described above, and the test was conducted until breakage occurred, with the upper limit of the number of cycles set to $5\times10^6$ cycles. If the railway axle 1 reached a cycle count of $5\times10^6$ cycles, the railway axle 1 was evaluated as having excellent fatigue strength ("E" (Excellent) in Table 1). On the other hand, if the railway axle 1 broke without reaching a cycle count of $5\times10^6$ cycles, the railway axle 1 was evaluated as not having excellent fatigue strength ("NA" (Not Acceptable) in Table 1). The evaluation result of the fatigue test for each test number is shown in Table 1.

[Evaluation Results]

Referring to Table 1, in the case of the railway axle 1 of Test Number 1-1, the dislocation density ρ obtained based on a CoKα characteristic X-ray diffraction result was $2.5\times10^{16}$ m$^{-2}$ or less, the half-value width B of the (211) diffraction plane measured by CoKα characteristic X-ray diffraction was 1.34 degrees or less, and Fn1 was 1.00 or more. As a result, in the fatigue test, the railway axle 1 of Test Number 1-1 had excellent fatigue strength.

On the other hand, in the case of the railway axle 1 of Test Number 1-2, the cooling rate CR (° C./sec) in the range from 500 to 200° C. during induction hardening was too fast. In addition, F in the induction hardening treatment and tempering was too high. Consequently, the dislocation density ρ obtained based on a CoKα characteristic X-ray diffraction result was more than $2.5\times10^{16}$ m$^2$. As a result, in the fatigue test, the railway axle 1 of Test Number 1-2 did not have excellent fatigue strength.

In the case of the railway axle 1 of Test Number 1-3, λ in the tempering conditions was too low. Consequently, the half-value width B of the (211) diffraction plane measured by CoKα characteristic X-ray diffraction was more than 1.34 degrees. As a result, in the fatigue test, the railway axle 1 of Test Number 1-3 did not have excellent fatigue strength.

In the case of the railway axle 1 of Test Number 1-4. F in the induction hardening treatment and tempering was too high. Consequently, Fn1 was less than 1.00. As a result, in the fatigue test, the railway axle 1 of Test Number 1-4 did not have excellent fatigue strength.

Example 2

In Example 2, test specimens simulating the railway axle 1 were prepared, and the fatigue strength at the center parallel portion was evaluated. Specifically, molten steels having the chemical compositions described in Table 2 were produced. Here, the symbol "-" in Table 2 means that the content of the corresponding element is at an impurity level. Specifically, the symbol "-" indicating each of the Cu, Ni, and V contents means that the content of each element is less than 0.01%. The symbol "-" indicating the Al content means that the Al content is less than 0.002%. The symbol "-" indicating each of the Ti and Nb contents means that the content of each element is less than 0.001%. The symbol "-" indicating each of the B and Ca contents means that the content of each element is less than 0.0001%.

TABLE 2

| Steel Number | Chemical Composition (unit is mass %; balance is Fe and impurities) | | | | | | | | | | | | | | | | |
| --- | --- | --- | --- | --- | --- | --- | --- | --- | --- | --- | --- | --- | --- | --- | --- | --- | --- |
| | C | Si | Mn | P | S | Cr | Mo | N | O | Cu | Ni | Al | V | Ti | Nb | B | Ca |
| 1 | 0.26 | 0.29 | 0.69 | 0.012 | 0.006 | 1.11 | 0.26 | 0.0036 | 0.0019 | — | — | 0.032 | — | — | — | — | — |
| 2 | 0.25 | 0.31 | 0.73 | 0.012 | 0.008 | 1.08 | 0.25 | 0.0032 | 0.0013 | 0.10 | 0.05 | 0.032 | — | — | — | — | — |
| 3 | 0.25 | 0.30 | 0.72 | 0.011 | 0.008 | 1.08 | 0.25 | 0.0039 | 0.0014 | — | — | — | — | — | — | — | — |
| 4 | 0.26 | 0.30 | 0.71 | 0.009 | 0.012 | 1.11 | 0.26 | 0.0056 | 0.0012 | 0.10 | 0.05 | 0.032 | 0.040 | — | — | — | — |
| 5 | 0.25 | 0.29 | 0.70 | 0.015 | 0.013 | 1.07 | 0.24 | 0.0045 | 0.0016 | — | — | 0.033 | — | 0.010 | — | — | — |
| 6 | 0.27 | 0.32 | 0.69 | 0.012 | 0.006 | 1.05 | 0.25 | 0.0048 | 0.0017 | — | — | 0.030 | — | — | 0.022 | — | — |
| 7 | 0.25 | 0.33 | 0.68 | 0.014 | 0.008 | 1.13 | 0.27 | 0.0037 | 0.0020 | — | — | 0.028 | — | — | — | 0.0014 | — |
| 8 | 0.26 | 0.29 | 0.72 | 0.013 | 0.009 | 1.11 | 0.26 | 0.0034 | 0.0017 | — | — | 0.026 | — | — | — | — | 0.0001 |

An ingot was produced from the molten steel of each of Steel Numbers 1 to 8. For Steel Number 1, the ingot was heated to 1250° C., and thereafter was subjected to hot forging to produce the crude product 10 having the shape of an axle illustrated in FIG. 3. For Steel Numbers 2 to 8, the ingot was heated to 1250° C., and thereafter was subjected to hot forging to produce a crude product having a shape that was 180 mm in diameter×300 mm in length. This is a shape in which the diameter is made substantially the same as the center parallel portion 30 of the axle shape illustrated in FIG. 3. The crude product 10 of each steel number was subjected to quenching and tempering. The heat treatment temperature during quenching was set to 890° C. which is higher than the $A_{c3}$ transformation point of the steel. The crude product 10 was held at the heat treatment temperature, and thereafter was subjected to water quenching. The crude product 10 of each test number after quenching was subjected to tempering. Regarding the tempering conditions, the tempering temperature was adjusted between 550 to 670° C. so that the crude products 10 of the respective test numbers had substantially the same surface hardness. Each crude product 10 was held at the tempering temperature for 120 minutes, and thereafter was allowed to cool until becoming normal temperature.

Figure 6:
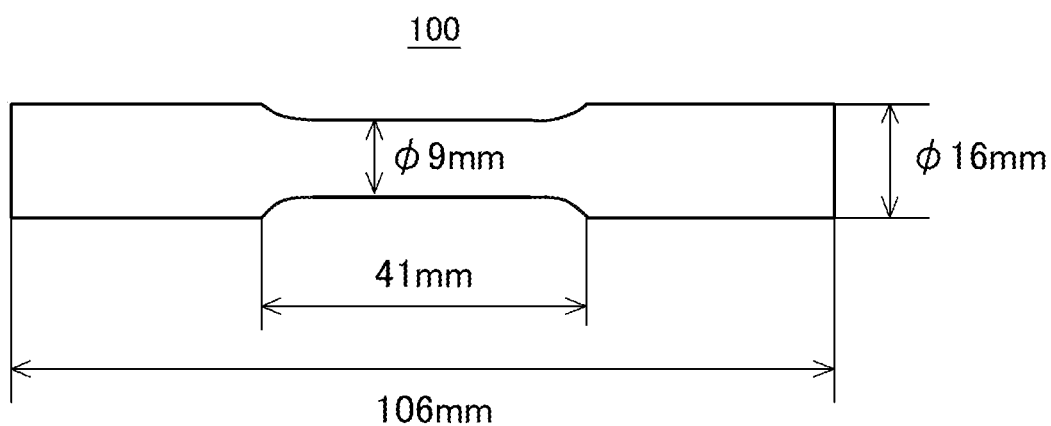
FIG. 6 is a cross-sectional view of a specimen used in the present examples.

A specimen of each test number was prepared from the crude product of each steel number. A specimen 100 had a shape illustrated in FIG. 6. FIG. 6 is a cross-sectional view of the specimen used in the present example. The specimen 100 of each test number was subjected to induction hardening. The induction hardening was performed in a manner so that the entire specimen 100 became a hardened layer. The quenching temperature during induction hardening was set to the $A_{c3}$ transformation point or more of the steel of each test number. The cooling rate CR (° C./sec) in the range from 500 to 200° C. during induction hardening is shown in Table 3. Note that, the cooling rate CR (° C./sec) was measured using a K-type thermocouple. Further, adjustment of the cooling rate CR (° C./sec) was performed by adjusting the water amount during cooling.

described above. An X-ray diffractometer was used for the measurement, and the measurement conditions were as follows: CoKα characteristic X-ray, a tube voltage of 30 kV, and a tube current of 100 mA. Calibration of a peak location corresponding to the diffraction angle was performed by confirming that the diffraction peak location of a specific plane did not deviate from a reference position using a Si standard sheet. Further, with respect to the half-value width, correction was performed by measuring the broadening of the device in advance using $LaB_6$ (lanthanum hexaboride) as a standard sample.

A peak location (2θ) and a half-value width (B') of the (110), (211), and (220) planes were determined from the

TABLE 3

| Test Number | Steel Number | CR (° C./sec) | T (° C.) | t (hour) | λ | F | Dislocation Density ρ ($10^{16}$ m$^{-2}$) | Half-value Width B (degrees) | Fn1 | Normalized Fatigue Limit |
|---|---|---|---|---|---|---|---|---|---|---|
| 2-1 | 1 | 20 | 200 | 1.0 | 9460 | 189200 | 2.1 | 1.25 | 1.19 | 1.58 |
| 2-2 | 2 | 20 | 200 | 1.0 | 9460 | 189200 | 1.9 | 1.26 | 1.29 | 1.55 |
| 2-3 | 3 | 20 | 200 | 1.0 | 9460 | 189200 | 2.0 | 1.19 | 1.39 | 1.54 |
| 2-4 | 4 | 20 | 200 | 1.0 | 9460 | 189200 | 2.2 | 1.23 | 1.18 | 1.59 |
| 2-5 | 5 | 20 | 200 | 1.0 | 9460 | 189200 | 2.0 | 1.26 | 1.23 | 1.55 |
| 2-6 | 6 | 20 | 200 | 1.0 | 9460 | 189200 | 1.9 | 1.18 | 1.49 | 1.56 |
| 2-7 | 7 | 20 | 200 | 1.0 | 9460 | 189200 | 2.1 | 1.22 | 1.26 | 1.55 |
| 2-8 | 8 | 20 | 200 | 1.0 | 9460 | 189200 | 2.2 | 1.20 | 1.25 | 1.54 |
| 2-9 | 1 | 100 | 200 | 3.0 | 9686 | 968568 | 2.6 | 1.21 | 1.04 | 1.42 |
| 2-10 | 1 | 12 | 150 | 0.3 | 8239 | 98866 | 2.0 | 1.35 | 1.01 | 1.46 |
| 2-11 | 1 | 50 | 200 | 1.5 | 9543 | 477165 | 2.4 | 1.29 | 0.96 | 1.47 |
| 2-12 | 1 | 80 | 200 | 2.0 | 9602 | 768191 | 2.5 | 1.26 | 0.98 | 1.48 |

Figure 7:
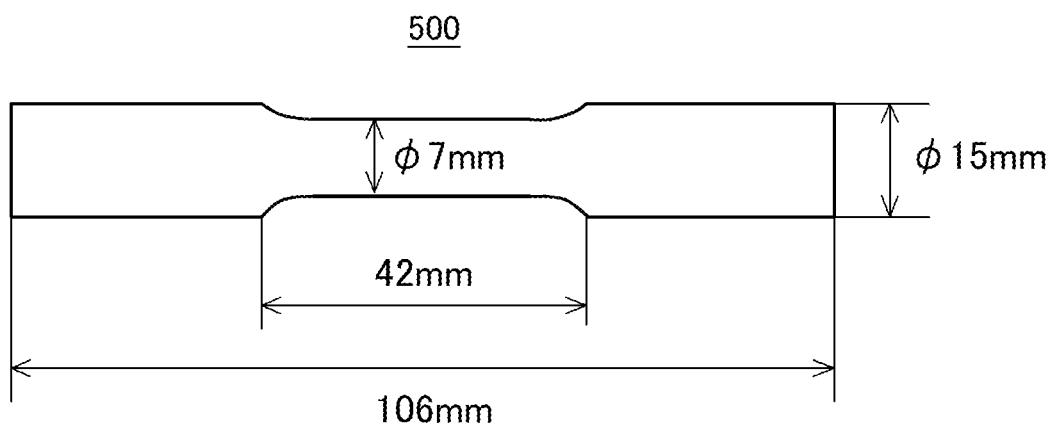
FIG. 7 is a cross-sectional view of a fatigue test specimen used in the present examples.

The specimen 100 of each test number that had undergone induction hardening was subjected to tempering. The tempering temperature (° C.) and the tempering time when performing the tempering on the specimen 100 of each test number are shown as "T(° C.)" and "t (hrs)", respectively, in Table 3. In addition, λ (=(273+T)×($\log_{10}$(t))+20) was determined based on the tempering temperature T (° C.) and the tempering time t (hrs) when performing the tempering on the specimen 100 of each test number, and the aforementioned Formula (A). The value of λ determined for each test number is shown in Table 3. In addition, F (=CR×λ) was determined based on the cooling rate CR (° C./sec) in the range from 500 to 200° C. during induction hardening performed on the specimen 100 of each test number, λ when performing tempering, and the aforementioned Formula (B). The value of F determined for each test number is shown in Table 3. The specimen 100 of each test number that had undergone tempering was subjected to machining to produce a fatigue test specimen 500 illustrated in FIG. 7. FIG. 7 is a cross-sectional view of the fatigue test specimen used in the present example.

[Evaluation Tests]

The fatigue test specimen 500 of each test number was subjected to an X-ray diffraction measurement test and a fatigue test which are described below.

[X-Ray Diffraction Measurement Test]

A test specimen for an X-ray diffraction measurement test was prepared from the produced fatigue test specimen 500 of each test number. The size of the test specimen was 10 mm in the circumferential direction×20 mm in the axial direction×5 mm in the radial direction of the railway axle 1. An area of 10 mm in the circumferential direction×20 mm in the axial direction was adopted as an observation surface, and the observation surface was subjected to mechanical polishing and electrolytic grinding, and X-ray diffraction measurement was then conducted according to the method obtained CoKα characteristic X-ray diffraction profile, and the dislocation density ρ ($10^{16}$ m$^{-2}$) in the test specimen was determined using the aforementioned Formula (2) and Formula (3). The obtained dislocation density ρ ($10^{16}$ m$^{-2}$) that was obtained based on an obtained CoKα characteristic X-ray diffraction result of each test number is shown as "dislocation density ρ" in Table 3. In addition, the peak of the (211) diffraction plane was identified from the obtained CoKα characteristic X-ray diffraction profile, and the half-value width thereof was determined. The determined half-value width B (degrees) of the (211) diffraction plane measured by CoKα characteristic X-ray diffraction of each test number is shown as "half-value width B (degrees)" in Table 3.

Further, for each test number, Fn1 (=(−4.8×$10^{16}$×B+8.5× $10^{16}$)/ρ) was determined based on the dislocation density ρ obtained based on a CoKα characteristic X-ray diffraction result ($10^{16}$ m$^{-2}$), the half-value width B (degrees) of the (211) diffraction plane measured by CoKα characteristic X-ray diffraction, and the aforementioned Formula (1). The value of Fn1 determined for each test number is shown in Table 3. Note that, with respect to Test Numbers 2-9, 2-10, and 2-11, in a preliminary test conducted in advance, almost no difference was observed from corresponding X-ray diffraction profiles shown in Table 1. Therefore, with respect to Test Numbers 2-9, 2-10, and 2-11, the measurement values shown in Table 1 were used for the dislocation density ρ obtained based on a CoKα characteristic X-ray diffraction result, the half-value width B of the (211) diffraction plane measured by CoKα characteristic X-ray diffraction, and Fn1.

[Fatigue Test]

The fatigue test specimen 500 of each test number was subjected to an Ono type rotating bending fatigue test. The test frequency was set to 60 Hz, and the test was conducted at room temperature (25° C.) in the atmosphere, until a number of cycles of 1×10⁷. The fatigue test was conducted using multiple test specimens in the vicinity of the fatigue limit, and the fatigue limit was determined in accordance with the modified staircase method. The Vickers hardness was determined with respect to a transverse section of a grip part of the fatigue test specimen 500 of each test number. The pressing force was set to 9.8 N, and the measurement average value obtained using a five point method (one point at the center and four points at an R/2 part of the transverse section) was defined as the Vickers hardness (HV) of each test number. For each test number, the obtained fatigue limit (MPa) was divided by the Vickers hardness (HV), and defined as the normalized fatigue limit of each test number. The obtained normalized fatigue limit is shown as "normalized fatigue limit" in Table 3.

[Evaluation Results]

Referring to Table 2 and Table 3, in the case of the specimen 100 of each of Test Numbers 2-1 to 2-8, the dislocation density ρ obtained based on a CoKα characteristic X-ray diffraction result was $2.5\times10^{16}$ m$^{-2}$ or less, the half-value width B of the (211) diffraction plane measured by CoKα characteristic X-ray diffraction was 1.34 degrees or less, and Fn1 was 1.00 or more. As a result, the normalized fatigue limit was 1.50 or more, and thus the specimen 100 had excellent fatigue strength.

On the other hand, in the case of the specimen 100 of Test Number 2-9, the cooling rate CR (° C./sec) in the range from 500 to 200° C. during induction hardening was too fast. In addition, F in the induction hardening treatment and tempering was too high. Consequently, the dislocation density ρ obtained based on a CoKα characteristic X-ray diffraction result was more than $2.5\times10^{16}$ m$^{-2}$. As a result, the normalized fatigue limit was less than 1.50, and thus the specimen 100 did not have excellent fatigue strength.

In the case of the specimen 100 of Test Number 2-10, λ in the tempering conditions was too low. Consequently, the half-value width B of the (211) diffraction plane measured by CoKα characteristic X-ray diffraction was more than 1.34 degrees. As a result, the normalized fatigue limit was less than 1.50, and thus the specimen 100 did not have excellent fatigue strength.

In the case of the specimen 100 of Test Numbers 2-11 and 2-12, F in the induction hardening treatment and tempering was too high. Consequently, Fn1 was less than 1.00. As a result, the normalized fatigue limit was less than 1.50, and thus the specimen 100 did not have excellent fatigue strength.

An embodiment of the present disclosure has been described above. However, the embodiment described above is merely an example for carrying out the present disclosure. Therefore, the present disclosure is not limited to the above-described embodiment, and can be implemented by appropriately modifying the above-described embodiment within a range that does not depart from the gist of the present disclosure.

REFERENCE SIGNS LIST

1 Railway axle
2 Fitting portion
3 Center parallel portion
2H Fitting portion hardened layer
3H Center parallel portion hardened layer
BM Base metal portion

The invention claimed is:

1. A railway axle, comprising:
a pair of fitting portions, on each of which a railway wheel is to be press-fitted, and
a center parallel portion located between the pair of fitting portions, wherein:
the fitting portion includes:
a fitting portion hardened layer formed in an outer layer of the fitting portion, and
a base metal portion located inward of the fitting portion hardened layer;
the center parallel portion includes:
a center parallel portion hardened layer formed in an outer layer of the center parallel portion, and
the base metal portion located inward of the center parallel portion hardened layer;
the base metal portion consists of, in mass %,
C: 0.22 to 0.29%,
Si: 0.15 to 0.40%,
Mn: 0.50 to 0.80%,
P: 0.020% or less,
S: 0.040% or less,
Cr: 0.90 to 1.20%,
Mo: 0.15 to 0.30%,
N: 0.0200% or less,
O: 0.0040% or less,
Ca: 0 to 0.0010%,
Cu: 0 to 0.30%,
Ni: 0 to 0.30%,
Al: 0 to 0.100%,
V: 0 to 0.060%,
Ti: 0 to 0.020%,
Nb: 0 to 0.030%, and
B: 0 to 0.0050%,
with the balance being Fe and impurities; and
in a region having the Vickers hardness of 480 HV or more in the center parallel portion hardened layer,
a dislocation density ρ obtained based on a CoKα characteristic X-ray diffraction result is $2.5\times10^{16}$ m$^{-2}$ or less,
a half-value width B of a (211) diffraction plane measured by CoKα characteristic X-ray diffraction is 1.34 degrees or less, and
the dislocation density ρ obtained based on a CoKα characteristic X-ray diffraction result, and the half-value width B of a (211) diffraction plane measured by CoKα characteristic X-ray diffraction satisfy Formula (1):

$$(-4.8\times10^{16}\times B+8.5\times10^{16})/\rho \geq 1.00 \qquad (1)$$

wherein, in Formula (1), ρ is the dislocation density in m$^{-2}$ obtained based on a CoKα characteristic X-ray diffraction result, and B is the half-value width in degrees of a (211) diffraction plane measured by CoKα characteristic X-ray diffraction.

2. The railway axle according to claim 1, wherein:
the base metal portion has, in mass %, one or more elements selected from the group consisting of:
Cu: 0.01 to 0.30%,
Ni: 0.01 to 0.30%,
Al: 0.005 to 0.100%,
V: 0.005 to 0.060%,
Ti: 0.002 to 0.020%,
Nb: 0.002 to 0.030%, and
B: 0.0003 to 0.0050%.

* * * * *